US012626981B2

(12) United States Patent
Takahashi et al.

(10) Patent No.: US 12,626,981 B2
(45) Date of Patent: May 12, 2026

(54) HOLDING AN ELECTRICAL POWER STORAGE DEVICE WITH A STORAGE BATTERY HOLDER OF A HOLDING DEVICE

(71) Applicant: HONDA MOTOR CO., LTD., Tokyo (JP)

(72) Inventors: Tsutomu Takahashi, Wako (JP); Takashi Matsumoto, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 1098 days.

(21) Appl. No.: 17/640,368

(22) PCT Filed: Sep. 11, 2020

(86) PCT No.: PCT/JP2020/034486
§ 371 (c)(1),
(2) Date: Mar. 4, 2022

(87) PCT Pub. No.: WO2021/049622
PCT Pub. Date: Mar. 18, 2021

(65) Prior Publication Data
US 2022/0328917 A1 Oct. 13, 2022

(30) Foreign Application Priority Data

Sep. 11, 2019 (JP) ................................. 2019-165552

(51) Int. Cl.
*H01M 50/204* (2021.01)
*H01M 10/46* (2006.01)
*H02J 7/00* (2006.01)
(52) U.S. Cl.
CPC ......... *H01M 50/204* (2021.01); *H01M 10/46* (2013.01); *H02J 7/0013* (2013.01)

(58) Field of Classification Search
CPC .... H01M 50/204; H01M 50/20; H01M 50/00; H01M 10/46; H01M 10/42;
(Continued)

(56) References Cited

U.S. PATENT DOCUMENTS 3,799,063 A * 3/1974 Reed ....................... B60L 50/66
104/34
5,574,354 A * 11/1996 Kohchi ................... B60L 53/80
320/109
(Continued)

FOREIGN PATENT DOCUMENTS

CN           1277414      12/2000
CN         102693743       9/2012
(Continued)

OTHER PUBLICATIONS

Chinese Office Action and Search Report for Chinese Patent Application No. 202080062907.4 dated Apr. 29, 2023.
(Continued)

*Primary Examiner* — James M Dolak
(74) *Attorney, Agent, or Firm* — Amin, Turocy & Watson, LLP

(57) ABSTRACT

Provided is a holding device capable of holding an electric device preferably. A battery replacement machine holding a mobile battery is provided with: a battery tray on which the mobile battery is held and which is provided turnably about a turning axis so as to be positioned at first and second positions; and a front tray locking mechanism for regulating the turning of the battery tray when the battery tray is at the second position, wherein when the battery tray is at the first position, a bottom part holding the mobile battery is relatively close to a horizontal state as compared to when the battery tray is at the second position.

21 Claims, 31 Drawing Sheets

(58) Field of Classification Search
CPC .... H01M 10/4207; G07F 17/00; H01R 13/00; H01R 13/447; H01R 13/44; H05K 7/00; H05K 7/1401; H05K 7/14
See application file for complete search history.

(56) References Cited

U.S. PATENT DOCUMENTS

| | | | | |
|---|---|---|---|---|
| 6,154,006 A * | 11/2000 | Hatanaka | B60L 53/305 320/109 |
| 6,177,879 B1 * | 1/2001 | Kokubu | B62M 6/90 340/432 |
| 6,423,443 B1 * | 7/2002 | Tsuboi | B60K 1/04 180/68.5 |
| 6,498,457 B1 | 12/2002 | Tsuboi | |
| 7,726,427 B2 * | 6/2010 | Picavet | B60R 16/04 180/68.5 |
| 8,162,191 B2 * | 4/2012 | Tetsuka | B62J 43/30 224/459 |
| 8,517,131 B2 * | 8/2013 | Kovach | H01M 50/249 180/68.5 |
| 8,859,127 B2 * | 10/2014 | Han | H01M 50/204 429/100 |
| 8,881,857 B2 * | 11/2014 | Binggeli | B62M 6/90 180/68.5 |
| 9,085,342 B2 * | 7/2015 | Jauvtis | B62M 6/60 |
| 9,130,211 B2 * | 9/2015 | Ogawa | B62H 5/00 |
| 9,187,004 B1 * | 11/2015 | Davis | B60L 53/30 |
| 9,230,390 B2 * | 1/2016 | Gospodarek | H02J 7/0013 |
| 9,276,418 B2 * | 3/2016 | Kawasaki | H02J 7/0013 |
| 9,399,499 B2 * | 7/2016 | Honda | B62M 6/90 |
| 9,597,973 B2 * | 3/2017 | Penilla | G06F 3/0362 |
| 9,781,857 B2 * | 10/2017 | Jau | G06K 1/183 |
| 10,014,701 B2 * | 7/2018 | Toya | H02J 7/34 |
| 10,040,359 B2 * | 8/2018 | Chen | B60L 58/26 |
| 10,116,152 B2 * | 10/2018 | Lin | H01M 50/271 |
| 10,183,591 B2 * | 1/2019 | Shieh | B62K 19/40 |
| 10,532,667 B2 * | 1/2020 | Chen | B60L 53/305 |
| 10,600,116 B2 * | 3/2020 | Takatsuka | G06Q 10/02 |
| 10,797,497 B2 * | 10/2020 | Steiner | B60L 53/665 |
| 10,840,719 B2 * | 11/2020 | Matsumoto | H01M 10/441 |
| 10,875,506 B2 * | 12/2020 | Koketsu | B60S 5/06 |
| 11,056,806 B2 * | 7/2021 | Etsunagi | H01M 50/271 |
| 11,114,872 B2 * | 9/2021 | Shikanai | H01M 10/46 |
| 11,228,189 B2 * | 1/2022 | Matsuyama | B60L 53/80 |
| 11,245,273 B2 * | 2/2022 | Jyoti | H01M 50/278 |
| 12,120,837 B2 * | 10/2024 | Matsumoto | H01M 10/441 |
| 12,444,961 B2 * | 10/2025 | Zeiler | H02J 7/0048 |
| 12,463,282 B2 * | 11/2025 | Zhao | H01M 50/503 |
| 2010/0292877 A1 * | 11/2010 | Lee | B60L 50/66 180/68.5 |
| 2012/0250878 A1 | 10/2012 | Ito | |
| 2016/0081219 A1 | 3/2016 | Jau et al. | |
| 2019/0393627 A1 | 12/2019 | Etsunagi et al. | |
| 2020/0001836 A1 | 1/2020 | Koketsu et al. | |

FOREIGN PATENT DOCUMENTS

| | | |
|---|---|---|
| CN | 105744792 | 7/2016 |
| JP | 2000-048863 | 2/2000 |
| JP | 2005-353483 | 12/2005 |
| JP | 3904740 | 4/2007 |
| JP | 2011-072123 | 4/2011 |
| JP | 2015-012780 | 1/2015 |
| JP | 2017-073838 | 4/2017 |
| JP | 6286084 | 2/2018 |
| JP | 2018-160417 | 10/2018 |
| JP | 2019-068711 | 4/2019 |
| TW | I512438 | 12/2015 |

OTHER PUBLICATIONS

International Search Report and Written Opinion for International Application No. PCT/JP2020/034486 mailed on Dec. 1, 2020, 12 pages.
Chinese Office Action and Search Report for Chinese Patent Application No. 202080062907.4 dated Dec. 13, 2023.

* cited by examiner

FIG. 10

FIG. 14
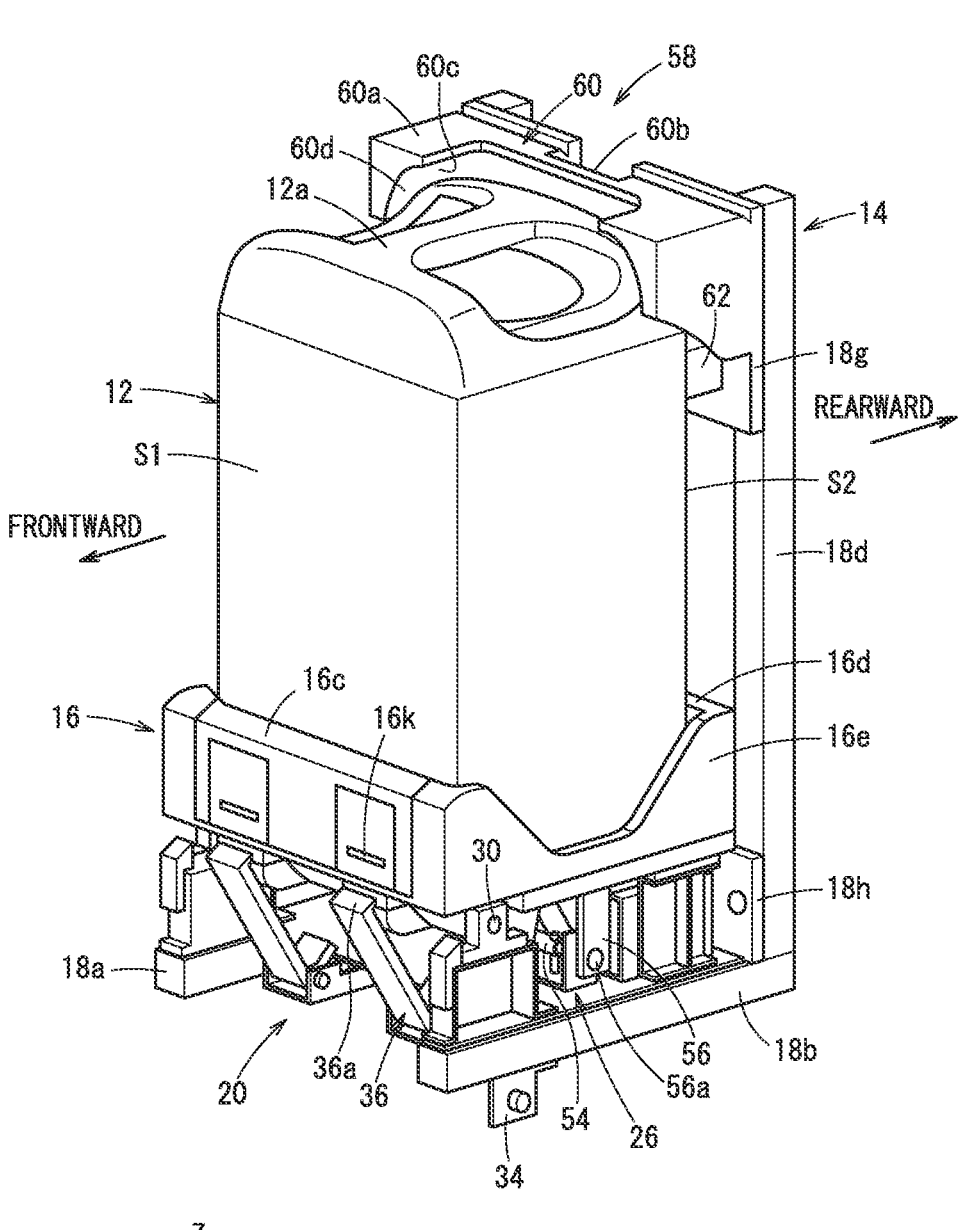
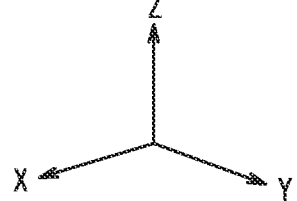

FIG. 15

FRONTWARD

REARWARD

F I G. 18
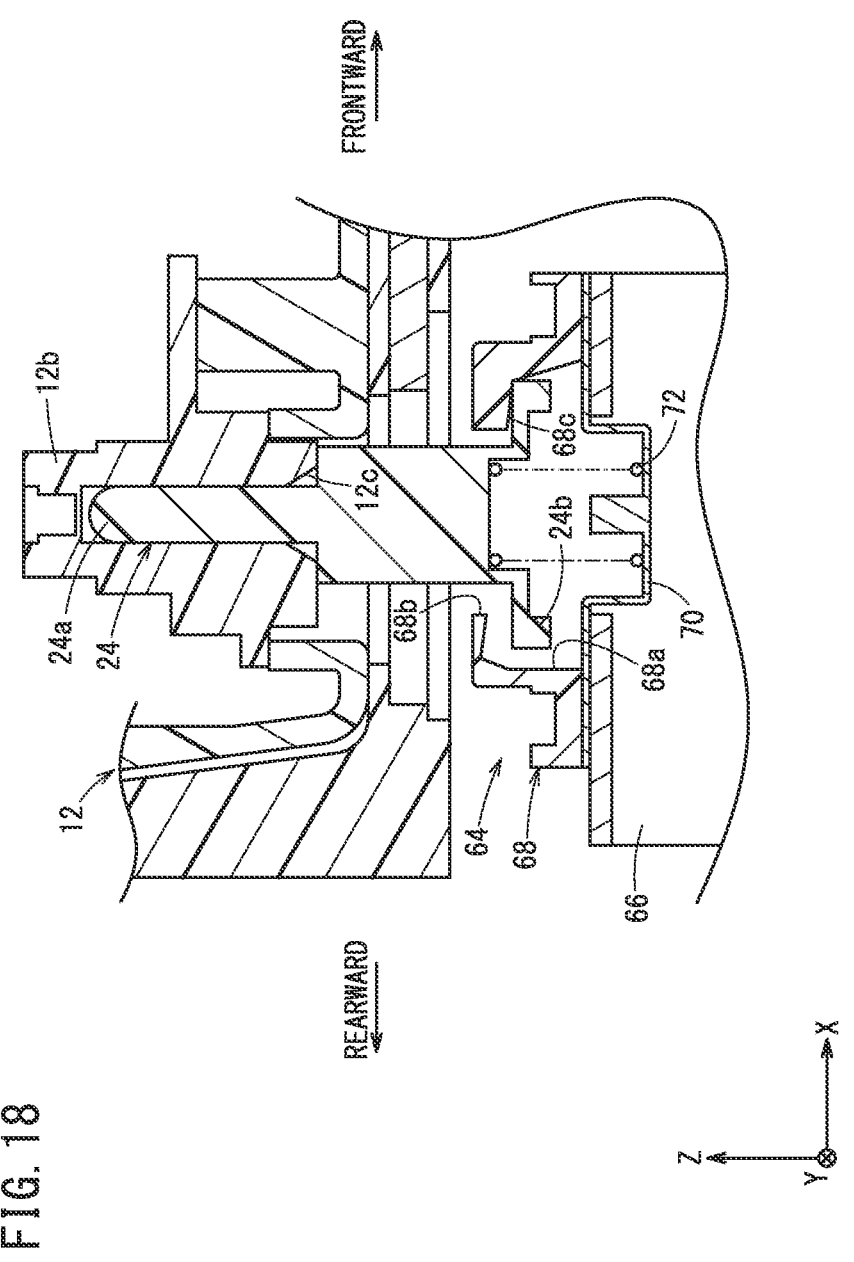

FIG. 28
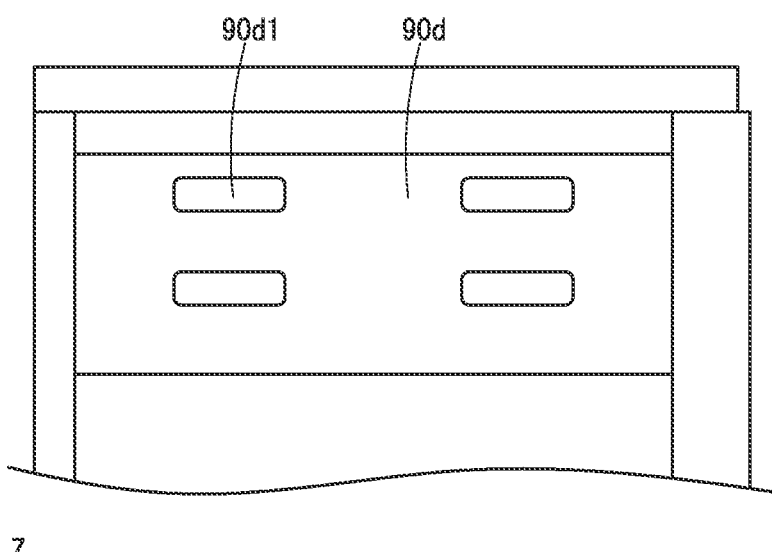
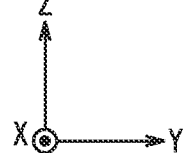

FIG. 29
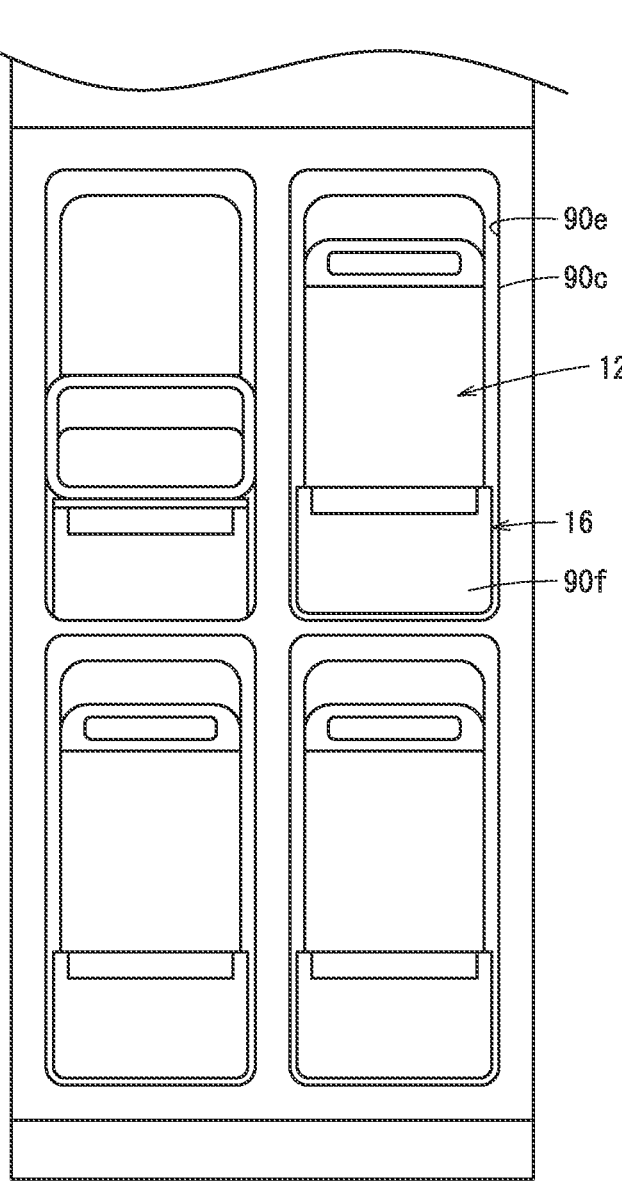
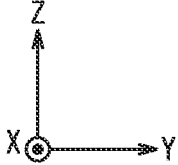

HOLDING AN ELECTRICAL POWER STORAGE DEVICE WITH A STORAGE BATTERY HOLDER OF A HOLDING DEVICE

TECHNICAL FIELD

The present invention relates to a holding device in which electrical equipment is accommodated or placed and held.

BACKGROUND ART

In JP 3904740 B2 and JP 6286084 B1, a device is disclosed in which storage batteries are accommodated in the interior thereof.

SUMMARY OF THE INVENTION

In the technology disclosed in JP 3904740 B2 and JP 6286084 B1, there is room for improvement in relation to a mechanism for retaining electrical equipment such as storage batteries or the like in the interior thereof.

The present invention has been devised in order to solve the aforementioned problem, and has the object of providing a holding device in which electrical equipment is capable of being satisfactorily held.

An aspect of the present invention is characterized by a holding device configured to hold electrical equipment accommodated or placed therein, the holding device comprising a holding unit configured to hold the electrical equipment, and which is disposed to be capable of rotating about a rotary axis so as to be positioned in a first position and a second position, a regulating unit configured to restrict rotation of the holding unit in a case in which the holding unit is positioned in the second position, wherein, in a case in which the holding unit is positioned in the first position, a holding surface configured to hold the electrical equipment is in a state of being relatively close to a horizontal state, as compared to a case in which the holding unit is positioned in the second position.

According to the present invention, the electrical equipment is capable of being satisfactorily held.

BRIEF DESCRIPTION OF DRAWINGS

FIG. 10 is a perspective view of the battery tray;

FIG. 14 is a perspective view of the battery holder;

FIG. 15 is a schematic diagram of the battery holder.

FIG. 18 is a cross-sectional view of the portion of the connector unit of the battery holder;

FIG. 28 is an enlarged view of an operation panel;

FIG. 29 is an enlarged view of slot portions;

DESCRIPTION OF THE INVENTION

First Embodiment

Hereinafter, a description will be given concerning a battery exchanging machine 10 according to a present embodiment.

[Overall Configuration of Battery Exchanging Machine]

Figure 1:
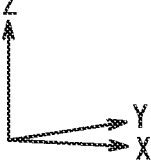
FIG. 1 is a schematic view of the external appearance of a battery exchanging machine.
Figure 2:
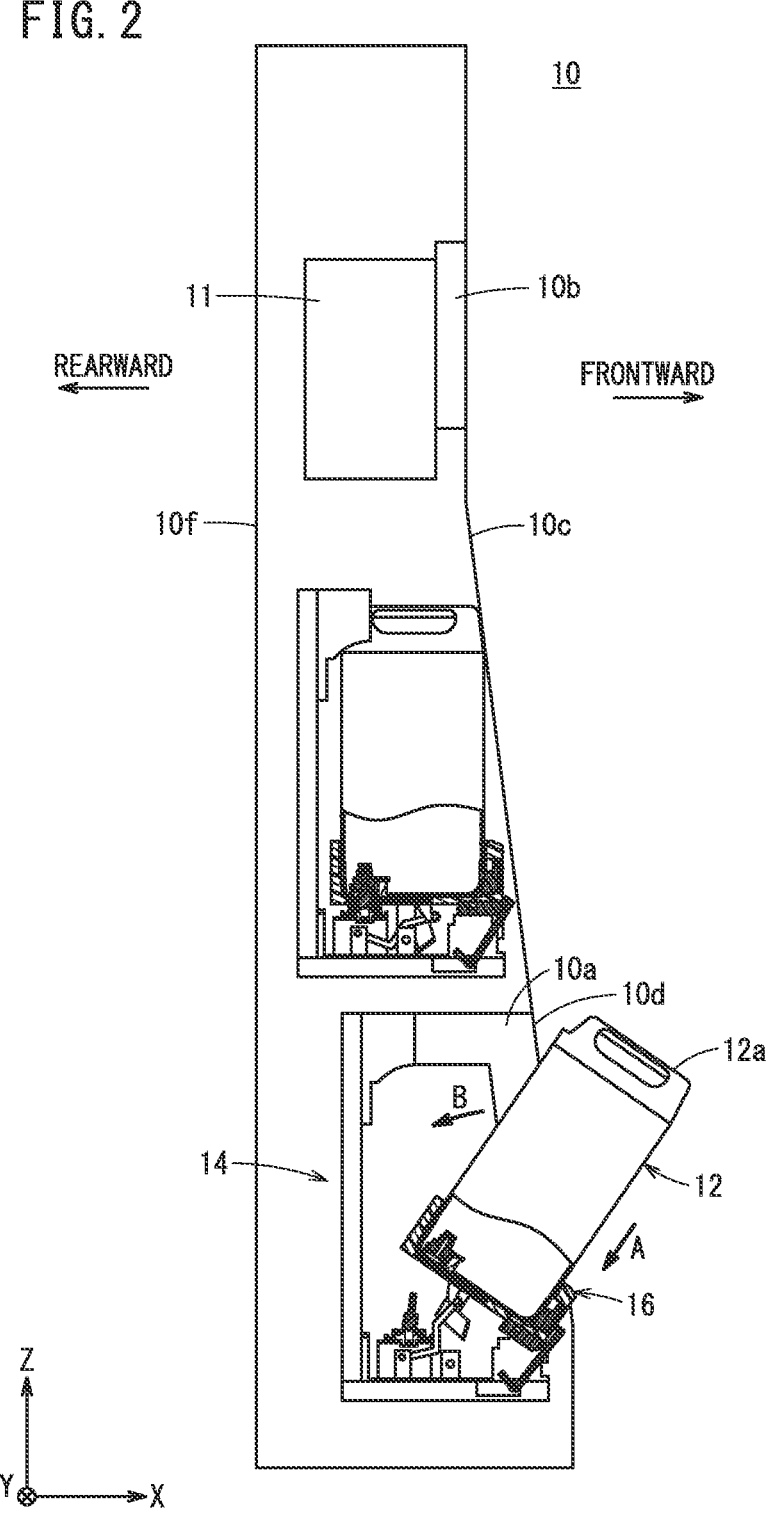
FIG. 2 is a cross-sectional view of the battery exchanging machine.

FIG. 1 is a schematic view of the external appearance of the battery exchanging machine 10. FIG. 2 is a cross-sectional view of the battery exchanging machine 10.

The battery exchanging machine 10 is a device in which mobile batteries 12 are accommodated in the interior thereof, and which carries out charging of the mobile batteries 12. One or a plurality of the battery exchanging machines 10 are installed in a battery station. A user deposits a mobile battery 12 having a low remaining power capacity (SOC: state of charge) in the battery exchanging machine 10, and receives another mobile battery 12 that has been fully charged from the battery exchanging machine 10. The battery exchanging machine 10 corresponds to a holding device of the present invention, and the mobile batteries 12 correspond to electrical equipment and power storage devices of the present invention.

As shown in FIG. 1, the battery exchanging machine 10 includes eight slots 10a and a single operation panel 10b. The mobile batteries 12 are set in the respective slots 10a. Openings 10d are formed in the front surface 10c of the battery exchanging machine 10 at positions corresponding to each of the slots 10a, and the mobile batteries 12 are inserted into and taken out from the openings 10d. Doors that open and close the openings 10d may be included in each of the openings 10d. Indicators 10e are provided above the slots 10a. The indicators 10e display a charging status of the mobile batteries 12 that are accommodated in the slots 10a, an availability (an empty condition) of the slots 10a, or the like, by illumination of colors, flashing, or the like. The operation panel 10b is a device that is operated by the user. By operating the operation panel 10b, for example, the user carries out payment of a fee or the like.

A control device 11 is installed on an upper part of the battery exchanging machine 10 and on a rear surface side of the operation panel 10b. The control device 11 controls charging of the mobile batteries 12 and the like.

A battery holder 14 including a battery tray 16 is installed in each of the slots 10a. When the user deposits the mobile battery 12 in the battery exchanging machine 10, the user places the mobile battery 12 in the battery tray 16 of an empty slot 10a of the battery exchanging machine 10 (refer to the arrow A in FIG. 2). At this time, the battery tray 16 is placed in a forwardly inclined state by being tilted down toward a frontward side (a side of the front surface 10c, a side of the opening 10d). The mobile battery 12 is placed on the battery tray 16 in such a forwardly inclined state. Thereafter, the user grasps a handle 12a on the upper part of the mobile battery 12 and pushes the mobile battery 12 inwardly to a rearward side (a side opposite to the front surface 10c, a side opposite to the opening 10d) so as to raise the mobile battery 12 that is in the forwardly inclined state (refer to the arrow B in FIG. 2). Consequently, the mobile battery 12 is placed in a state of being set in the slot 10a, and the battery exchanging machine 10 initiates charging of the mobile battery 12. In a state in which the mobile battery 12 is set in the slot 10a, the longitudinal direction of the mobile battery 12 is substantially parallel to the vertical direction (the direction of gravity, the upper-lower direction). The battery tray 16 corresponds to a holding unit of the present invention.

When the user receives the mobile battery 12 from the battery exchanging machine 10, the user pays a fee by operating the operation panel 10b. When the fee is paid, a fully charged mobile battery 12 is slowly tilted forward together with the battery tray 16. The user grasps the handle 12a of the mobile battery 12, removes the mobile battery 12 from the battery tray 16, and receives the mobile battery 12.

Assuming that the above-described battery exchanging machine 10 has been installed in a public location such as in a city or the like, an example has been presented in which the user receives the mobile battery 12 from the battery exchanging machine 10 after the user has paid the fee by operating the operation panel 10b. In the case that the battery exchanging machine 10 is installed on private property, for example, such as a business office or a residence, the user may operate the operation panel 10b, and after having input an identifier and a password, the user may receive the mobile battery 12 from the battery exchanging machine 10.

The front surface 10c of the battery exchanging machine 10 is inclined rearwardly with respect to the vertical direction (the direction of gravity), and in a state in which the user is standing while facing toward the front surface 10c, an upper part of the front surface 10c is positioned more rearwardly with respect to the user than a lower part of the front surface 10c. Consequently, when the user sets the mobile battery 12 in a slot 10a, and further, when the user receives the mobile battery 12 from the slot 10a, the user can assume a forward leaning posture, and it becomes easy for the user to support the weight of the mobile battery 12.

Hereinafter, a description will be given concerning configurations of the respective members of the battery holder 14 based on an X-axis, a Y-axis, and a Z-axis, which are defined in the following manner. A depth direction of the battery exchanging machine 10 is defined as an X-axis direction, and the side of the front surface 10c is defined as a positive side. A width direction of the battery exchanging machine 10 is defined as a Y-axis direction, and a right side when the battery exchanging machine 10 is viewed from a position facing toward the front surface 10c is defined as a positive side. An upper-lower direction of the battery exchanging machine 10 is defined as a Z-axis direction, and an upper side thereof is defined as a positive side. Further, in the explanation below, the side of the front surface 10c of the battery exchanging machine 10 may be referred to as a frontward side, and a side of a rear surface 10f thereof may be referred to as a rearward side.

[Configuration of Battery Holder]

Figure 3:
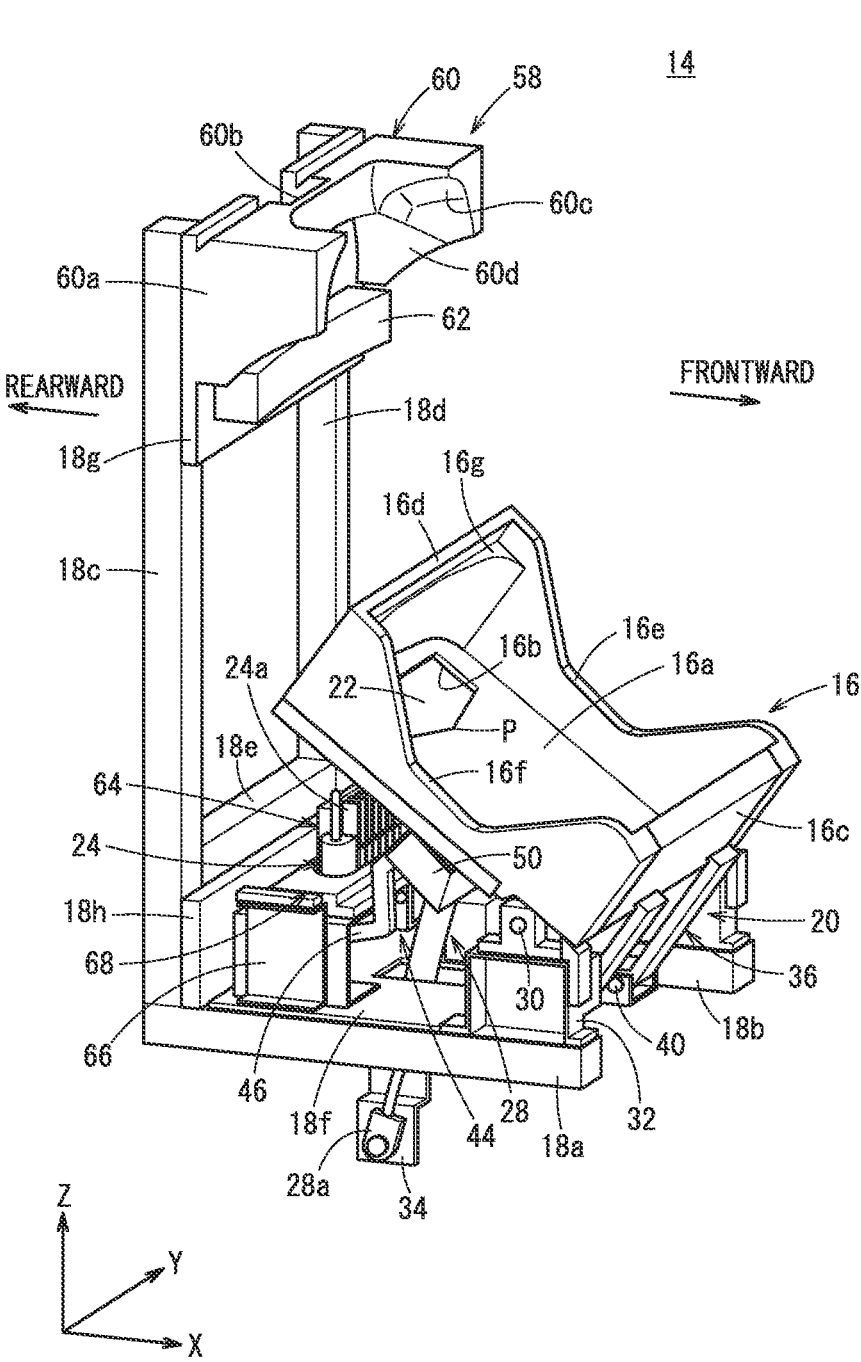
FIG. 3 is a perspective view of a battery holder.
Figure 4:
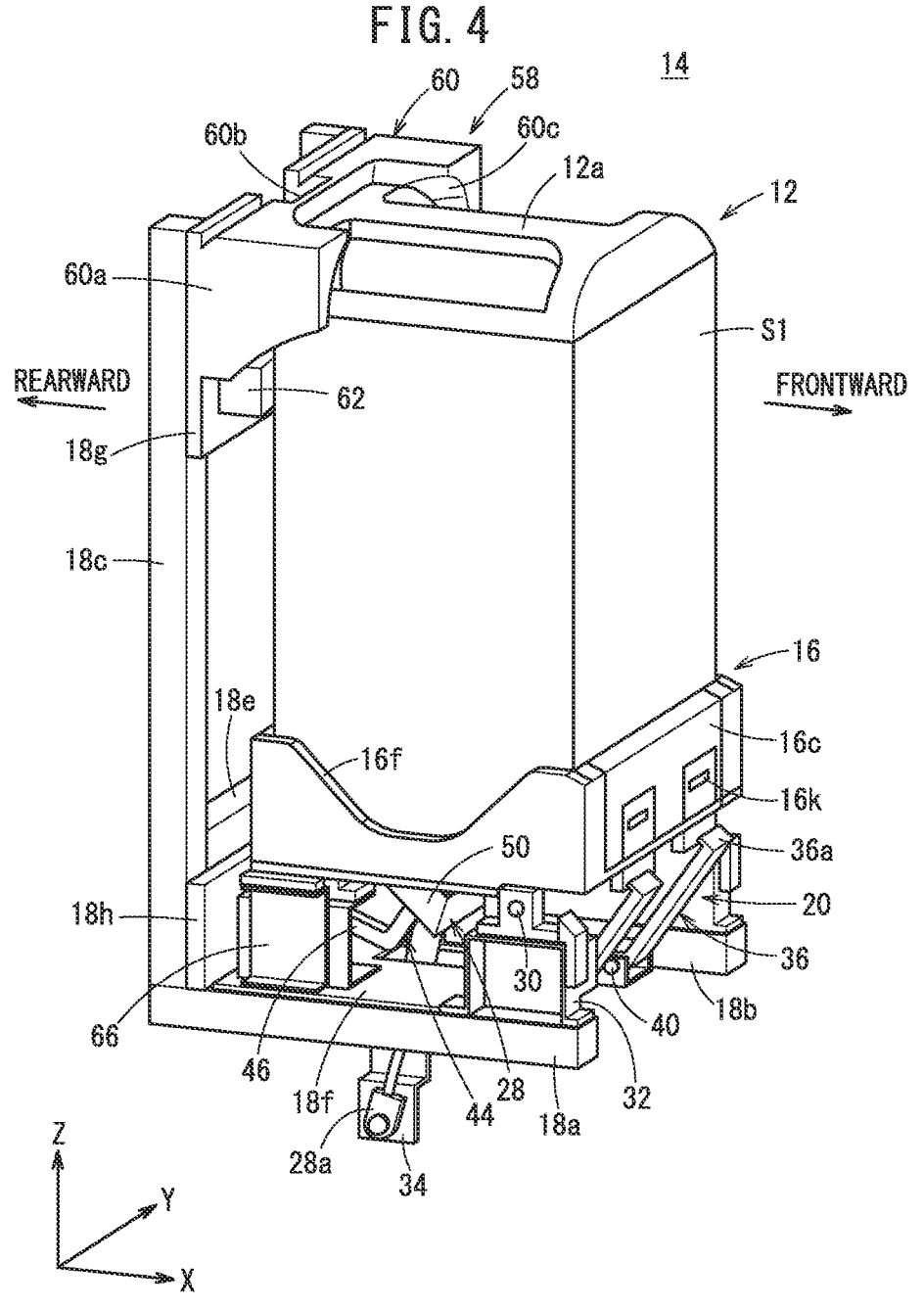
FIG. 4 is a perspective view of the battery holder.

FIGS. 3 and 4 are perspective views of the battery holder 14. FIG. 3 is a view showing a state in which the battery tray 16 is tilted toward the frontward side, and the mobile battery 12 is not placed on the battery tray 16. FIG. 4 is a view showing a state in which the battery tray 16 is pushed inwardly to the rearward side, and the mobile battery 12 is placed on the battery tray 16.

Figure 5:
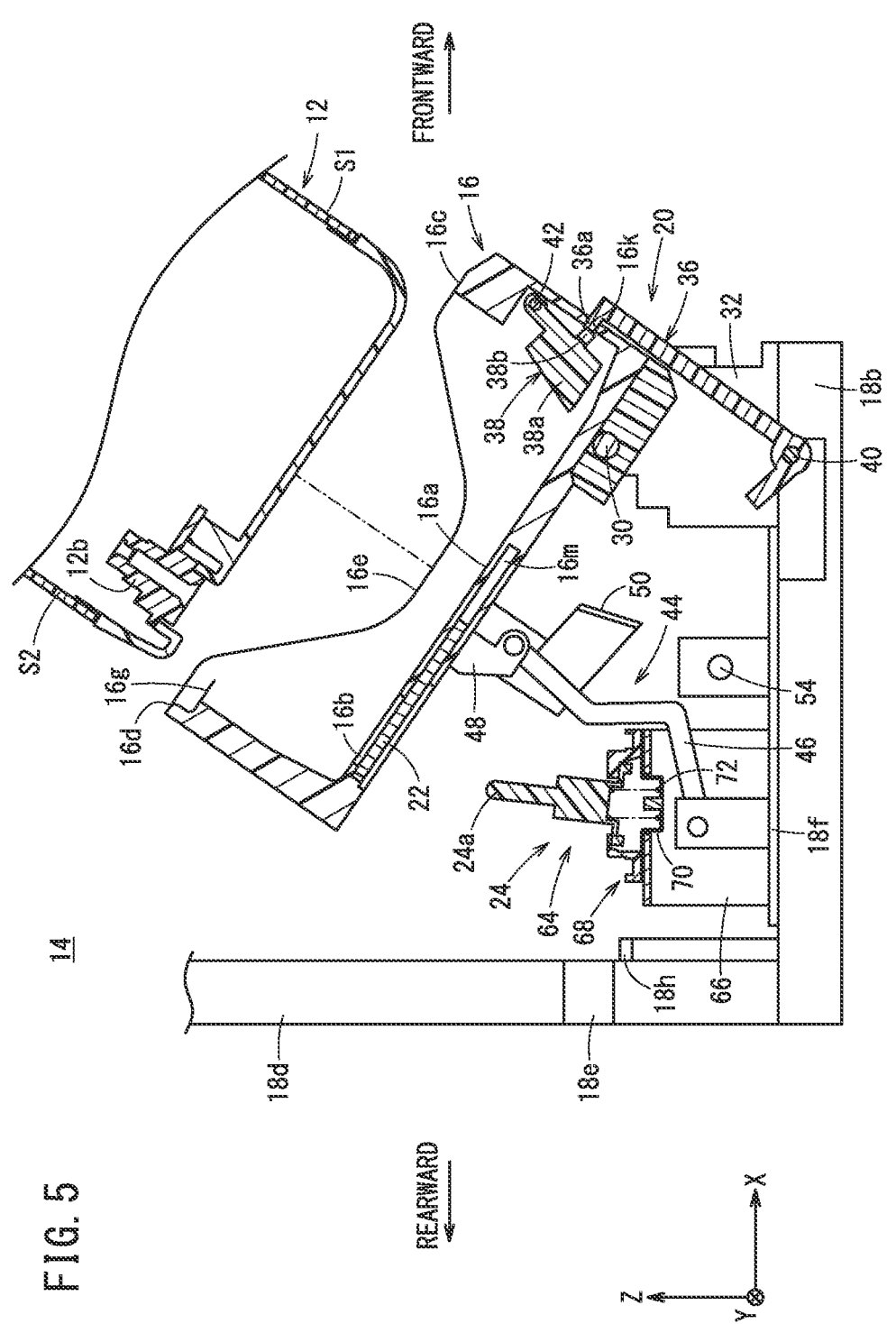
FIG. 5 is a partial cross-sectional view of the battery holder.
Figure 6:
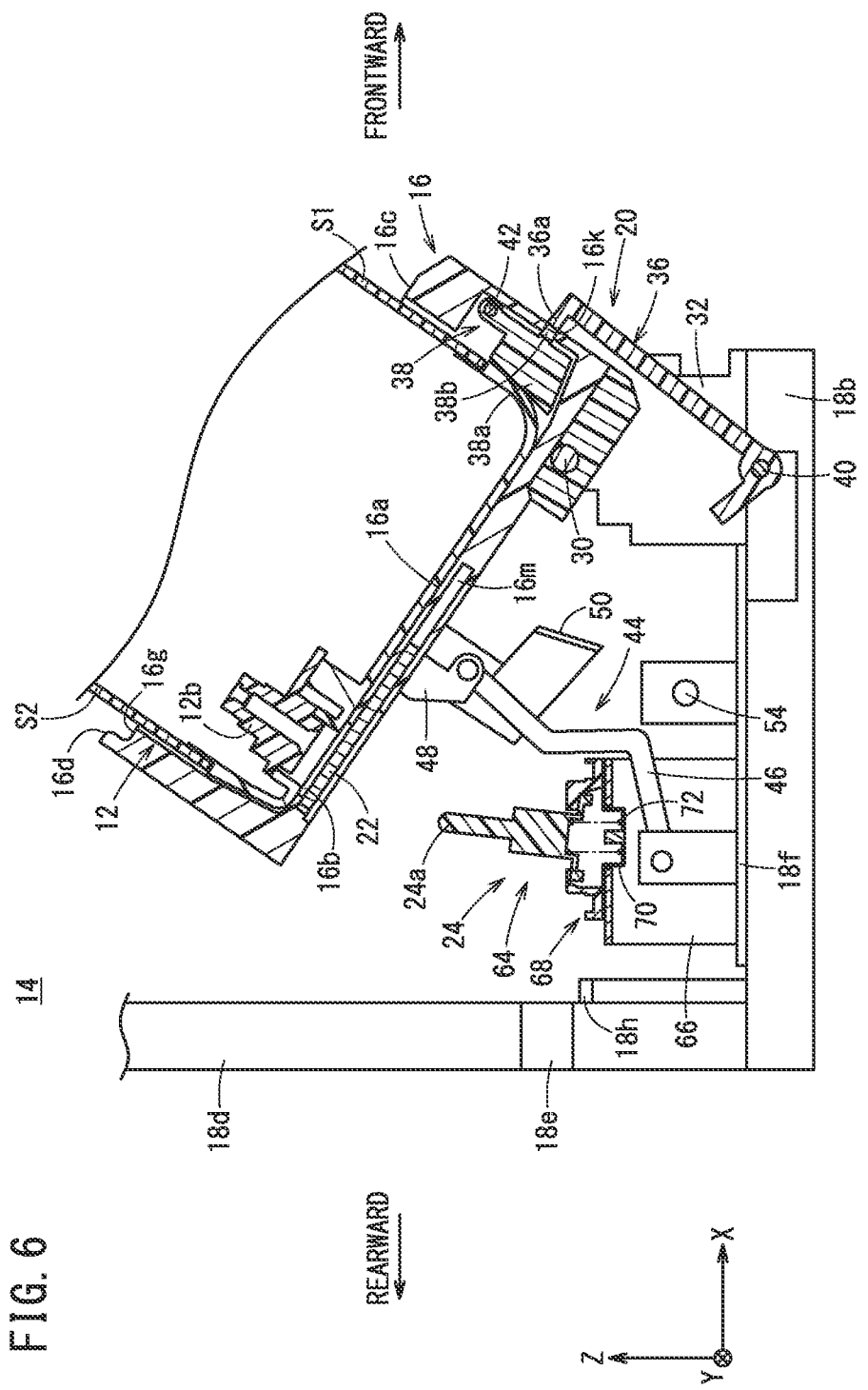
FIG. 6 is a partial cross-sectional view of the battery holder.
Figure 7:
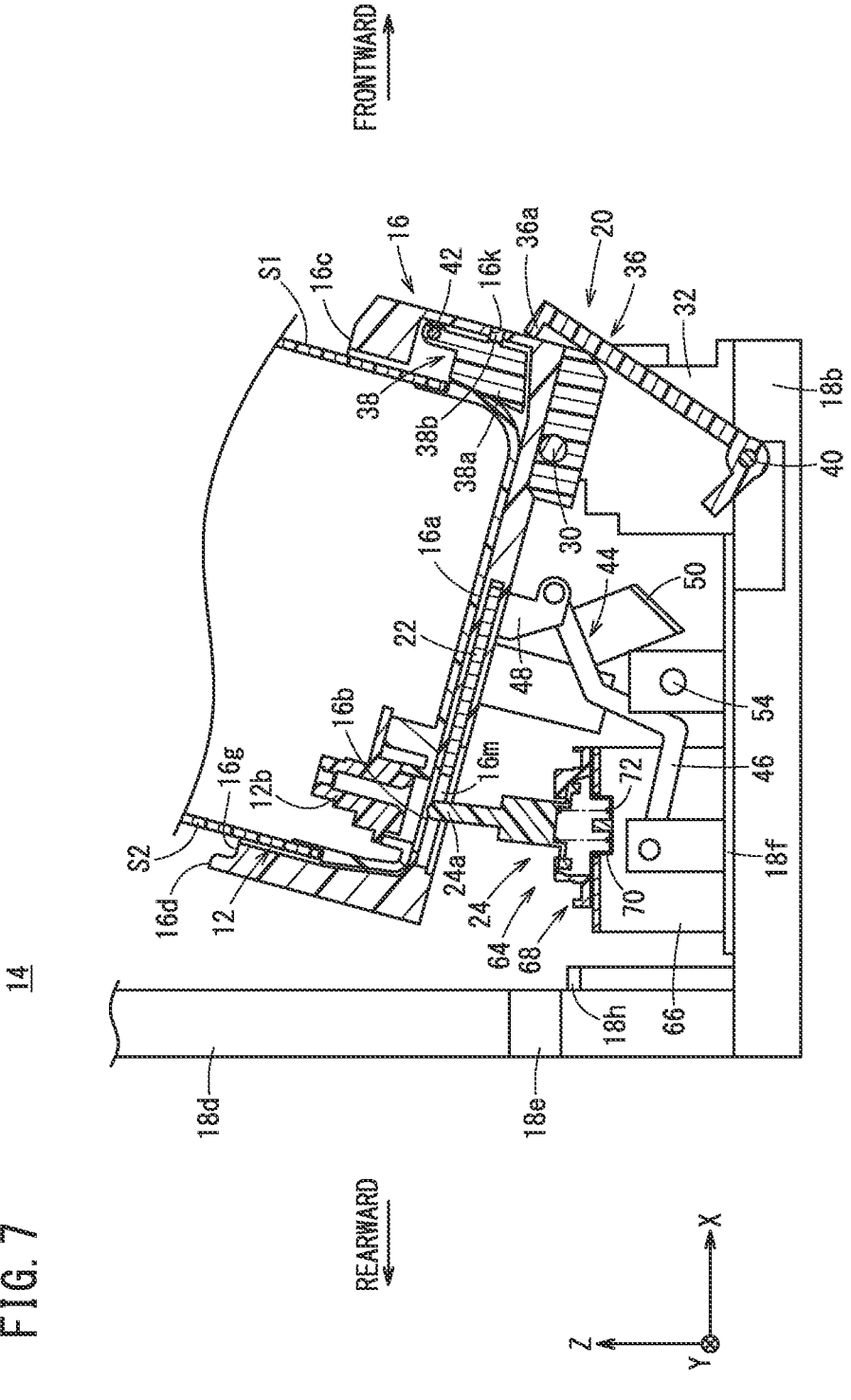
FIG. 7 is a partial cross-sectional view of the battery holder.
Figure 8:
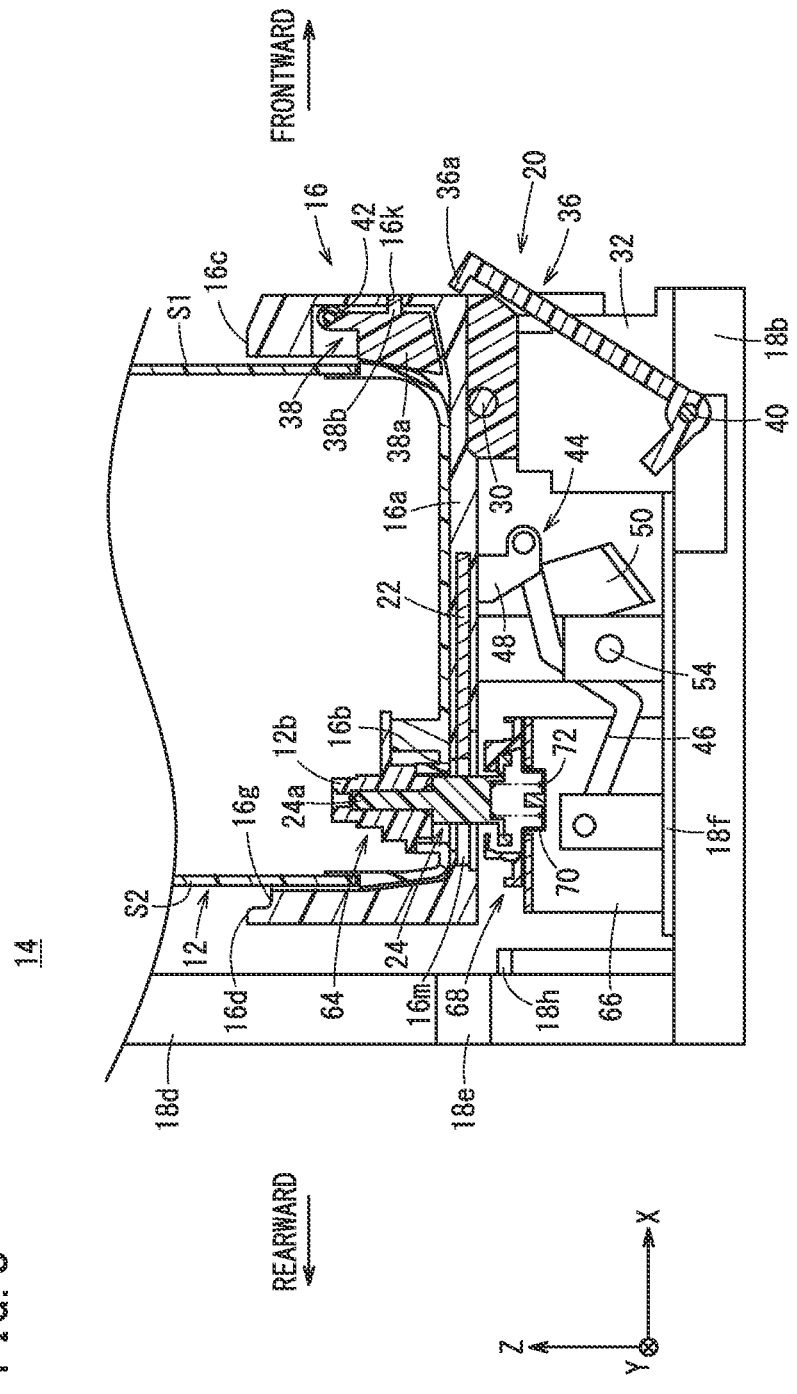
FIG. 8 is a partial cross-sectional view of the battery holder.

FIGS. 5, 6, 7, and 8 are partial cross-sectional views of the battery holder 14. FIG. 5 is a view showing a state in which the battery tray 16 is in a forwardly inclined state, and the mobile battery 12 is not placed on the battery tray 16. FIG. 6 is a view showing a state in which the battery tray 16 is in a forwardly inclined state, and the mobile battery 12 is placed on the battery tray 16. FIG. 7 is a view showing a state in which the mobile battery 12 and the battery tray 16 are being rotated to the rearward side. FIG. 8 is a view showing a state in which the mobile battery 12 and the battery tray 16 are pushed inwardly to the rearward side. Hereinafter, a position in the state of being pushed inwardly to the rearward side of the battery tray 16 shown in FIG. 8 is referred to as a first position, and a position in the forwardly inclined state of the battery tray 16 shown in FIGS. 5 and 6 is referred to as a second position. When the battery tray 16 is positioned in the first position, a bottom part 16a of the battery tray 16 is in a state of being relatively close to the horizontal state, as compared to a case in which the battery tray 16 is positioned in the second position. p The battery holder 14 includes as framework components thereof lower frames 18a and 18b, back frames 18c and 18d, and a side frame 18e (see FIGS. 3 and 4). The battery holder 14 includes as housing members thereof a lower panel 18f, an upper side panel 18g, and a lower side panel 18h (see FIGS. 3 and 4). The lower frames 18a and 18b are arranged so as to extend in the X-axis direction. The back frames 18c and 18d are arranged so as to extend from negative side end parts of the lower frames 18a and 18b in the X-axis direction toward a positive side in the Z-axis direction. The side frame 18e connects the back frame 18c and the back frame 18d, and is disposed so as to extend in the Y-axis direction. The lower panel 18f is fixed to the lower frame 18a and the lower frame 18b. The upper side panel 18g is fixed to the back frame 18c and the back frame 18d on a positive side in the Z-axis direction of the back frames 18c and 18d. The lower side panel 18h is fixed to the back frame 18c and the back frame 18d on a negative side in the Z-axis direction of the back frames 18c and 18d.

The battery tray 16 is installed to be capable of rotating about a rotary shaft 30 that is a center of rotation so as to be positioned in the first position and the second position with respect to the lower panel 18f. Hereinafter, in the direction of rotation of the battery tray 16, the direction in which the battery tray 16 is displaced from the first position to the second position may be referred to as a positive side in the direction of rotation.

When the mobile battery 12 is not placed therein, as shown in FIGS. 3 and 5, the battery tray 16 is locked by a front tray locking mechanism 20, and displacement of the battery tray 16 so as to rotate to the rearward side is restricted. When the battery tray 16 is in the forwardly inclined state, as shown in FIGS. 3 and 5, a connector hole 16b, which is formed in the bottom part 16a of the battery tray 16, is closed by a shutter 22. Consequently, since a connector 24 (a male-type connector 24) is not exposed to the exterior at the bottom part of the battery tray 16, an excessive force does not act on the connector 24 from the exterior, and it is possible to prevent liquid, dust, etc., that have entered from the exterior of the battery exchanging machine 10 from adhering to the connector 24.

When the mobile battery 12 is placed on the battery tray 16, locking of the battery tray 16 by the front tray locking mechanism 20 is released, and the restriction on displacement of the battery tray 16 so as to rotate to the rearward side is released. When the user pushes the mobile battery 12 inwardly to the rearward side so as to cause the mobile battery 12 to tilt, the battery tray 16 rotates to the rearward side together with the mobile battery 12. At this time, the shutter 22 is slid toward the frontward side by a shutter drive mechanism 44, and as shown in FIG. 8, the connector hole 16b of the bottom part 16a of the battery tray 16 is opened. The connector 24 enters into the interior of the battery tray 16 through the opened connector hole 16b. Consequently, as shown in FIG. 8, a connector pin 24a of the connector 24 is inserted into a connector 12b (a female-type connector 12b) on a bottom surface of the mobile battery 12. The connector hole 16b corresponds to an insertion section of the present invention, and the shutter 22 corresponds to a cover member of the present invention.

As shown in FIG. 8, in a state in which the battery tray 16 is pushed inwardly to the rearward side, the battery tray 16 is locked by a bottom tray locking mechanism 26 (see FIG. 14), and displacement of the battery tray 16 so as to rotate to the frontward side is restricted. At this time, as shown in FIG. 4, the mobile battery 12 is locked by a battery locking mechanism 58, and displacement of the mobile battery 12 in a direction to be removed from the battery tray 16 is restricted. Consequently, the user is incapable of taking the mobile battery 12 out from the battery tray 16, and removal of the mobile battery 12 from the battery exchanging machine 10 can be prevented.

When the user receives the mobile battery 12 from the battery exchanging machine 10, locking of the bottom tray locking mechanism 26 is released. Then, the battery tray 16 is pushed by a gas spring 28 so as to be rotated to the frontward side, and the mobile battery 12 is placed in an inclined state together with the battery tray 16. When the mobile battery 12 is rotated to the frontward side, locking of the battery locking mechanism 58 is released, whereupon the mobile battery 12 can be withdrawn from the battery tray 16, and the mobile battery 12 can be removed from the battery exchanging machine 10.

[Configuration of Battery Tray]

The battery tray 16 includes the bottom part 16a, and edge portions 16c to 16f that are formed so as to protrude from an outer peripheral portion of the bottom part 16a. As shown in FIGS. 3 and 4, on the rotary shaft 30 that is fixed to a rotary shaft bracket 32, the battery tray 16 is supported to be capable of rotating about the rotary shaft 30. The battery tray 16 is supported by the rotary shaft 30 on the frontward side of the bottom part 16a of the battery tray 16. The rotary shaft bracket 32 is fixed to a more positive side in the X-axis direction than a central portion of the lower panel 18f, and is installed so as to project out from the lower panel 18f in a positive direction in the Z-axis direction. When the battery tray 16 rotates from the rearward side to the frontward side and is changed from the first position to the second position, the rearward side of the battery tray 16 becomes higher, and the frontward side of the battery tray 16 becomes relatively lower. On the frontward side of the battery tray 16, because the change in height when the battery tray 16 is in the first position and when the battery tray 16 is in the second position can be reduced, it becomes easier for the user to place the mobile battery 12 on the battery tray 16, and it becomes easier for the mobile battery 12 to be accommodated in the battery exchanging machine 10.

As shown in FIGS. 3 and 4, the gas spring 28 is disposed between the bottom part 16a of the battery tray 16 and a spring bracket 34 that is fixed to the lower panel 18f. The gas spring 28 has a damper function of causing a damping force to be generated that hinders displacement of the battery tray 16 to be rotated to the rearward side, and a spring function for urging the battery tray 16 in a direction to rotate the battery tray 16 to the frontward side.

The spring bracket 34 is fixed to a more negative side in the X-axis direction than a central portion of the lower panel 18f, and is installed so as to extend to a negative side in the Z-axis direction. One end part 28a of the gas spring 28 is fixed to a negative end part in the Z-axis direction of the spring bracket 34. From among the respective members that make up the battery holder 14, the end part 28a of the gas spring 28 is positioned on a most negative side in the Z-axis direction. According to the present embodiment, the end part 28a of the gas spring 28 is positioned to the greatest extent possible on the negative side in the X-axis direction. As shown in FIG. 2, the lower battery holders 14 are arranged more on the frontward side than the upper battery holders 14. Consequently, when the battery exchanging machine 10 is viewed from the direction of the Z-axis, the battery trays 16 of the lower battery holders 14 are arranged so as to be offset more to the frontward side than the battery trays 16 of the upper battery holders 14. Thus, the user is capable of easily setting the mobile batteries 12 in the slots 10a. Further, it is possible to avoid interference from occurring between the end parts 28a of the gas springs 28 of the upper battery holders 14 and the lower battery holders 14. Due to the end parts 28a of the gas springs 28 being positioned on the negative side in the X-axis direction, the lower battery holders 14 can be arranged on the frontward side of the battery exchanging machine 10, and the depth dimension of the battery exchanging machine 10 can be reduced.

Figures 9A, 9B:
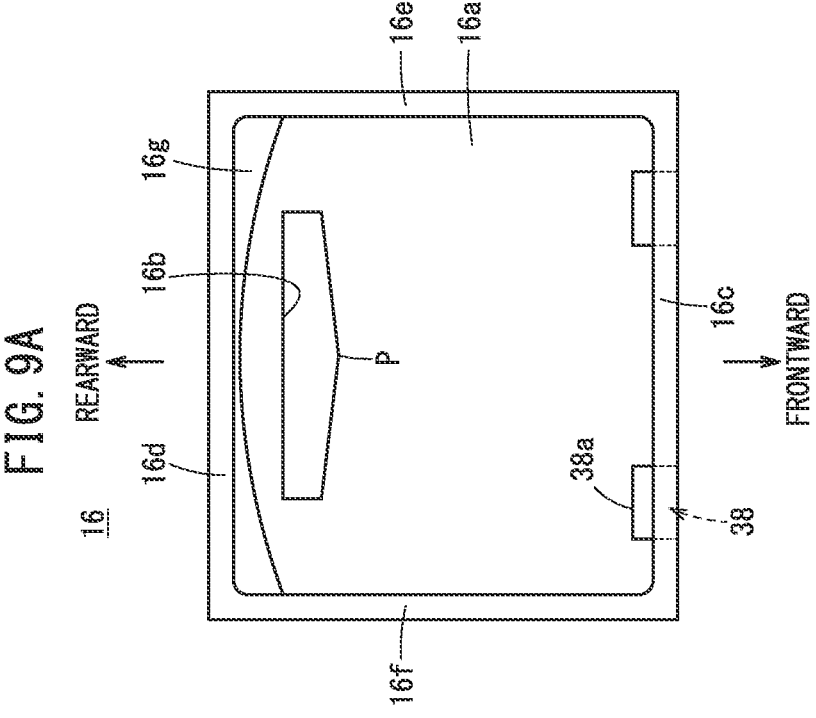
FIG. 9A is a front view of an inner bottom surface of a bottom part of a battery tray.
FIG. 9B is a front view of an upper surface of a mobile battery on which a handle is provided.

A stepped portion 16g that projects toward an inner side is formed on an edge portion 16d on the rearward side of the battery tray 16. FIG. 9A is a front view of an inner bottom surface of the bottom part 16a of the battery tray 16. FIG. 9B is a front view of an upper surface of the mobile battery 12 on which the handle 12a is provided.

As shown in FIG. 9B, concerning the mobile battery 12, one side surface S1 thereof from among the four side surfaces, excluding the upper surface on which the handle 12a is provided and the bottom surface on which the connector 12b is provided, is formed in the shape of a substantially flat planar surface. Another side surface S2, which is a rear surface in relation to the side surface S1, is formed in the shape of a convexly curved surface on the outer side thereof. An inner side surface of the stepped portion 16g of the battery tray 16 is formed to follow along with the shape of the side surface S2 of the mobile battery 12.

In a state in which the side surface S2 of the mobile battery 12 faces toward the side of the stepped portion 16g of the battery tray 16, the user is capable of inserting the mobile battery 12 into the battery tray 16. On the other hand, in a state in which the side surface S1 of the mobile battery 12 faces toward the side of the stepped portion 16g of the battery tray 16, even if the user attempts to insert the mobile battery 12 into the battery tray 16, the bottom surface of the mobile battery 12 sits on the stepped portion 16g. Therefore, it is impossible for the user to insert the mobile battery 12 into the battery tray 16.

In a reversely inserted state in which the mobile battery 12 is inserted into the battery tray 16 in an incorrect direction (at an inappropriate posture), the positions of the connector 12b of the mobile battery 12 and the connector 24 of the battery holder 14 do not coincide. Provisionally, even in a state in which the mobile battery 12 is inserted into the battery tray 16 in the reversely inserted state, the mobile battery 12 presses on inclined surfaces 38a of flaps 38, and a state is brought about in which locking of the battery tray 16 by the front tray locking mechanism 20 is released. When such locking is released, the battery tray 16 rotates to the rearward side, and the shutter 22 opens the connector hole 16b. In addition, since the connector 24 enters from the opened connector hole 16b into the interior of the battery tray 16, the connector 24 may come into contact with the bottom surface of the mobile battery 12, and there is a concern that an excessive load may act on the connector 24.

According to the present embodiment, due to the stepped portion 16g being provided for the battery tray 16, the mobile battery 12 is prevented from being reversely inserted into the battery tray 16. In the reversely inserted state, since the mobile battery 12 is incapable of being inserted into the battery tray 16, the mobile battery 12 does not press on the inclined surfaces 38a of the flaps 38. Therefore, since engagement between claw portions 36a of hooks 36 of the front tray locking mechanism 20 and engagement holes 16k of the edge portion 16c of the battery tray 16 is not released, locking of the battery tray 16 is not released, and displacement of the battery tray 16 so as to rotate to the rearward side is restricted. Thus, it is possible to avoid a situation in which the connector 24 comes into contact with the bottom surface of the mobile battery 12, and it is possible to prevent an excessive load from being applied to the connector 24.

Moreover, it should be noted that providing the stepped portion 16g on the battery tray 16 is also effective in relation to a type of battery tray 16 in which the connector 24 is directly attached to the bottom part 16a. Owing to the stepped portion 16g, the mobile battery 12 is incapable of being inserted into the battery tray 16 in the reversely inserted state. Therefore, it is possible to avoid a situation in which the bottom surface of the mobile battery 12 comes into contact with the connector 24 that protrudes from the bottom part 16a, and it is possible to prevent an excessive load from being applied to the connector 24.

As shown in FIG. 9A, the connector hole 16b, which is formed in the bottom part 16a of the battery tray 16, is formed in a pentagonal shape, and is formed in a manner so that a vertex P of one of the five vertices thereof is located on a more frontward side than the other four vertices. When the battery tray 16 is tilted to the forward side, the vertex P is positioned more downwardly in the direction of gravity than the other four vertices (see FIG. 3). Consequently, dust or debris accumulated on the shutter 22 is accumulated in the vicinity of the vertex P. When the connector hole 16b is opened, although the shutter 22 slides to the frontward side with respect to the battery tray 16, the shutter is stopped on a more rearward side than the vertex P. Therefore, it is possible to prevent the dust or debris that is accumulated on the shutter 22 from falling down from the connector hole 16b to the side of the connector 24.

Figure 10:
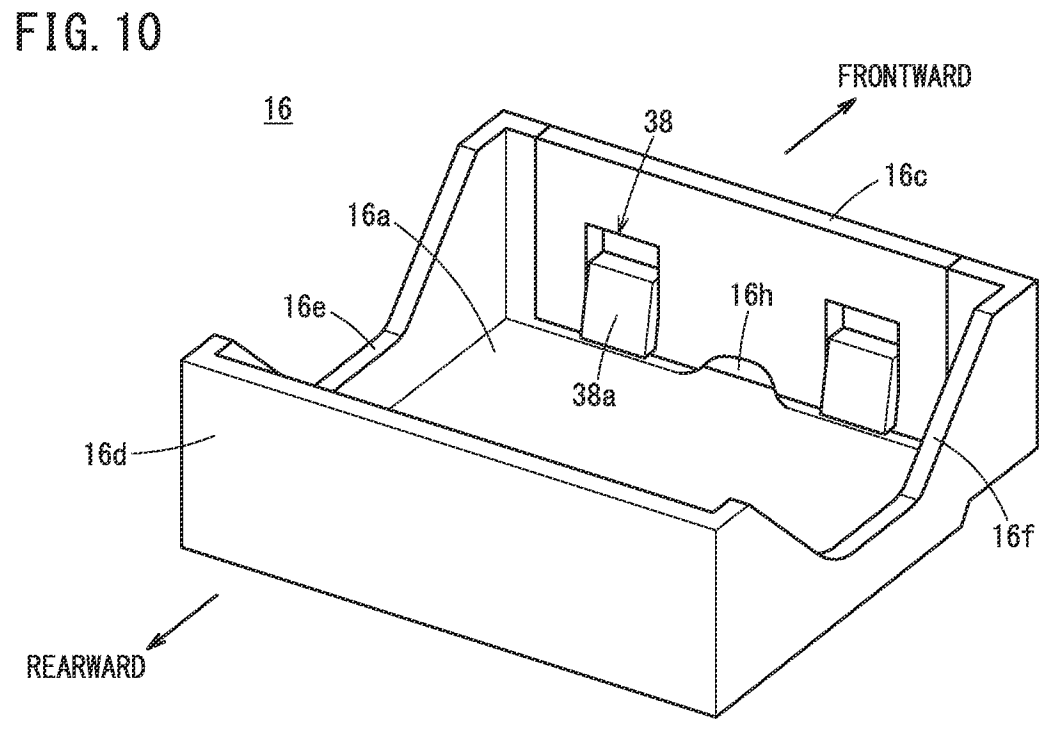

FIG. 10 is a perspective view of the battery tray 16. A drain hole 16h is formed in the battery tray 16 at a portion in which the edge portion 16c on the frontward side is connected to the bottom part 16a. When the battery tray 16 is tilted forward, the drain hole 16h is positioned at a lowermost part in the direction of gravity on the inner side of the battery tray 16. Therefore, liquid that has entered into the battery tray 16 is discharged from the drain hole 16h, and it is possible to prevent the liquid from penetrating to the side of the connector 24.

[Front Tray Locking Mechanism]

As shown in FIGS. 5, 6, 7, and 8, the front tray locking mechanism 20 includes the hooks 36 and the flaps 38. On the rotary shaft 40 that is fixed to the lower panel 18f, the hooks 36 are supported to be capable of rotating about the rotary shaft 40. The hooks 36 are urged by non-illustrated winding springs in a direction of counterclockwise rotation about the rotary shaft 40 shown in FIGS. 5, 6, 7, and 8. The claw portions 36a are formed at the distal ends of the hooks 36. As shown in FIG. 5, the claw portions 36a are formed so as to be capable of engagement with the engagement holes 16k that are formed in the edge portion 16c on the frontward side of the battery tray 16. As shown in FIGS. 3 and 4, two hooks 36 are provided so as to be separated from each other in the Y-axis direction. The hooks 36 correspond to engaging elements of the present invention.

The rotary shaft 40 may be fixed to the lower frames 18a and 18b instead of being fixed to the lower panel 18f. The lower frames 18a and 18b correspond to the framework components of the present invention, and the lower panel 18f corresponds to a housing of the present invention.

On rotary shafts 42 that are fixed to the edge portion 16c on the frontward side of the battery tray 16, the flaps 38 are supported to be capable of rotating about the rotary shafts 42. The flaps 38 include the inclined surfaces 38a, and protruding portions 38b that protrude from surfaces on an opposite side of the inclined surfaces 38a. As shown in FIGS. 6, 7, and 8, the protruding portions 38b are formed so as to be capable of being inserted into the engagement holes 16k of the aforementioned edge portion 16c. As shown in FIG. 10, two of the flaps 38 are provided at positions corresponding to positions at which the hooks 36 are provided, and are separated from each other in the Y-axis direction.

In a state in which the battery tray 16 is in the forwardly inclined state, and the mobile battery 12 is not placed on the battery tray 16, as shown in FIG. 5, the claw portions 36a of the hooks 36 are engaged with the engagement holes 16k of the edge portions 16c. The protruding portions 38b of the flaps 38 are pushed out from the engagement holes 16k by the claw portions 36a, and the inclined surfaces 38a of the flaps 38 are positioned on the inner side of the inner peripheral surface of the edge portion 16c. At this time, a state is brought about in which the battery tray 16 is locked by the front tray locking mechanism 20, and displacement of the battery tray 16 so as to rotate to the rearward side is restricted.

When the mobile battery 12 is placed on the battery tray 16, as shown in FIG. 6, the inclined surfaces 38a of the flaps 38 are pressed by the side surface S1 of the mobile battery 12 toward the side of the hooks 36. Consequently, the protruding portions 38b of the flaps 38 press on the claw portions 36a of the hooks 36, and engagement between the claw portions 36a and the engagement holes 16k of the edge portions 16c is released. Consequently, the battery tray 16 is placed in a state in which locking thereof by the front tray locking mechanism 20 is released, and as shown in FIGS. 7 and 8, the battery tray 16 becomes capable of being rotated to the rearward side. The flaps 38 correspond to operating elements of the present invention.

At least a portion of the front tray locking mechanism 20 is arranged at a position in a more forward direction of rotation than the battery tray 16. Therefore, in the case that engagement between the claw portions 36a of the hooks 36 and the engagement holes 16k of the edge portion 16c is released, and the battery tray 16 assumes a further forward leaning posture due to the weight of the mobile battery 12, then since the battery tray 16 interferes with the front tray locking mechanism 20, displacement of the battery tray 16 to rotate in the forward direction of rotation is restricted.

When the mobile battery 12 is placed on the battery tray 16, the side surface S1 of the mobile battery 12 may press directly on the claw portions 36a of the hooks 36, and engagement between the claw portions 36a and the engagement holes 16k of the edge portion 16c may be released. In this case, the flaps 38 can be omitted.

The bottom part 16a of the battery tray 16 corresponds to a holding surface of the present invention, and the front tray locking mechanism 20 corresponds to a regulating unit of the present invention.

[Shutter Drive Mechanism]

Figure 11:
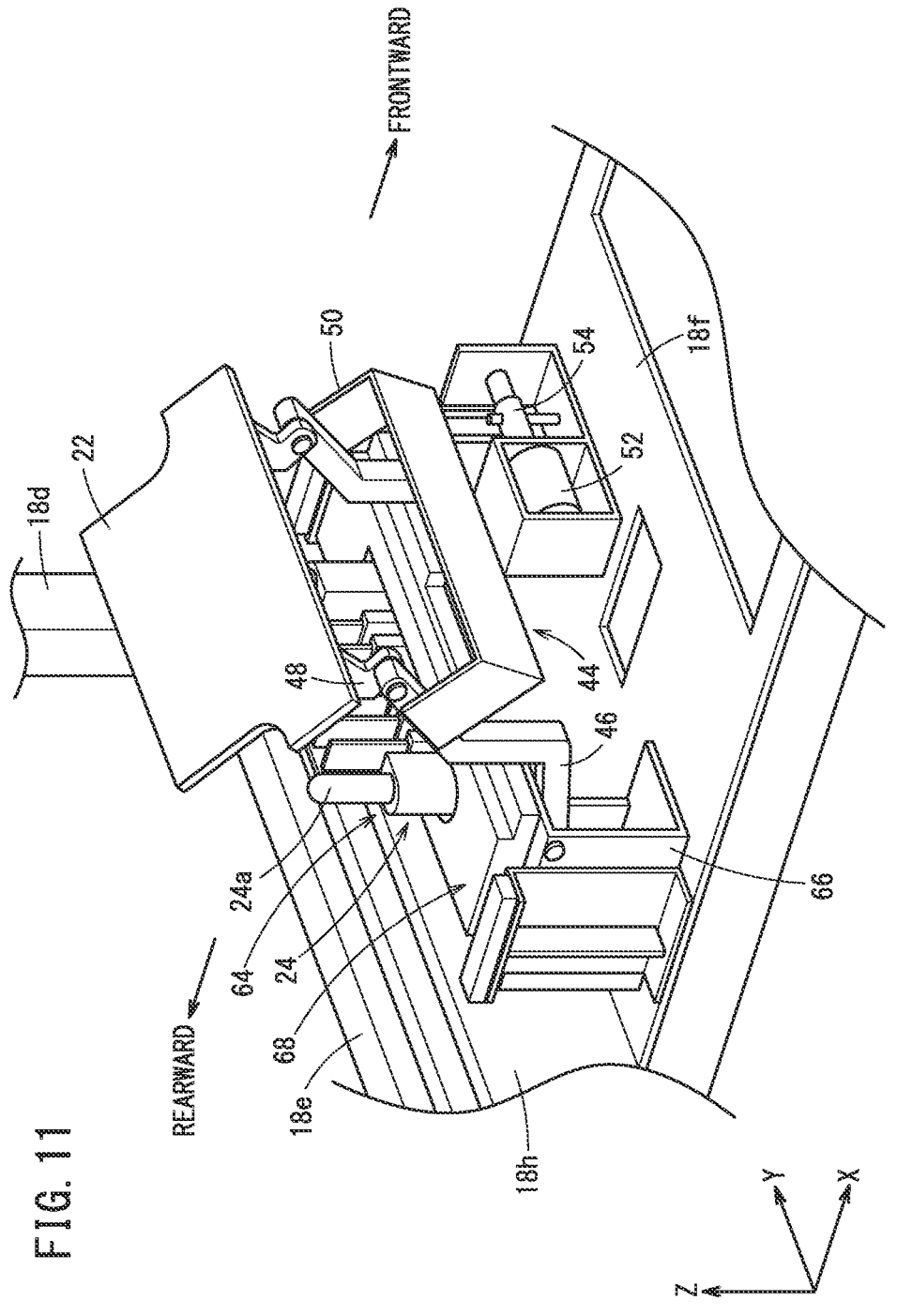
FIG. 11 is a perspective view of a shutter and a shutter drive mechanism.
Figure 12:
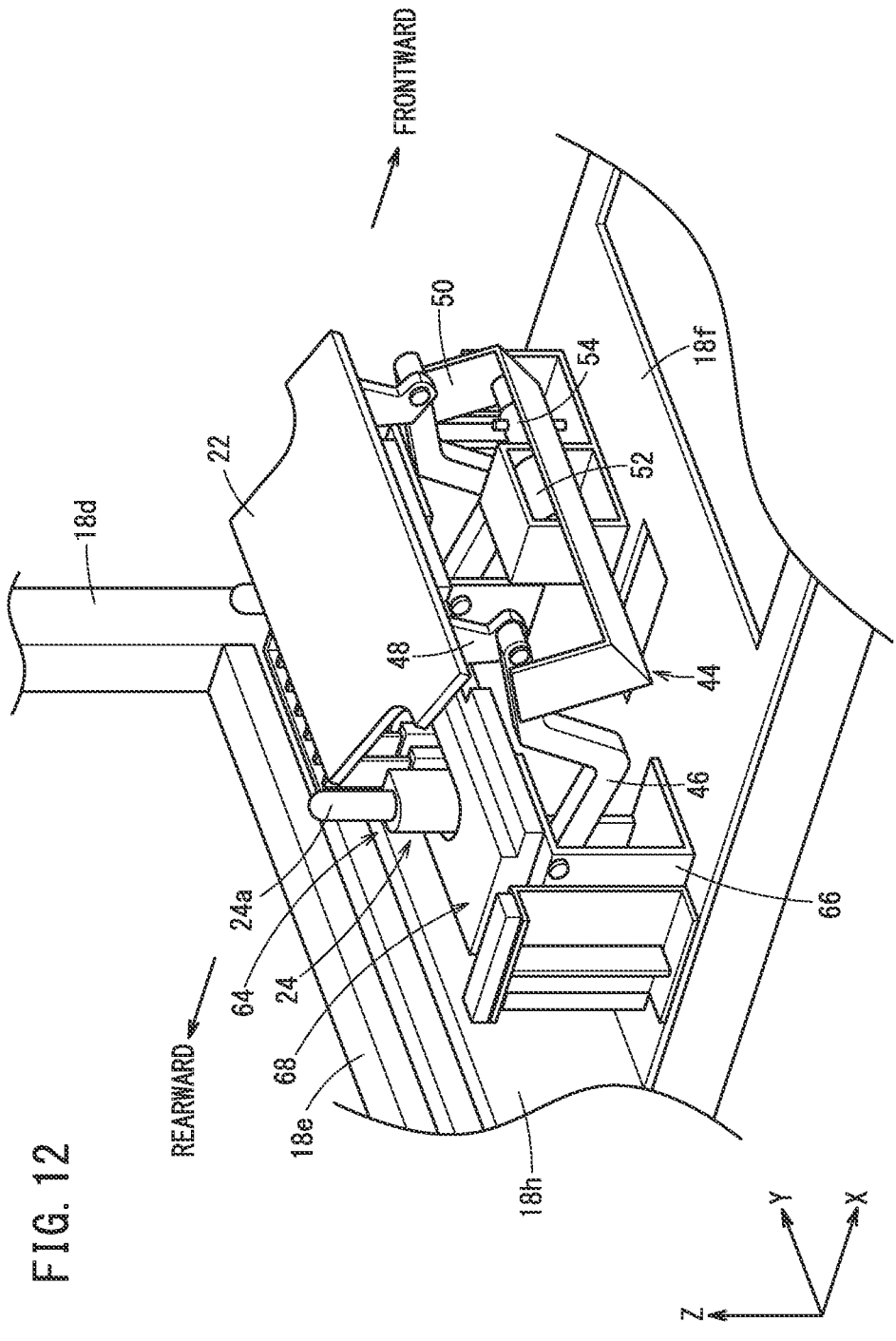
FIG. 12 is a perspective view of the shutter and the shutter drive mechanism.
Figure 13:
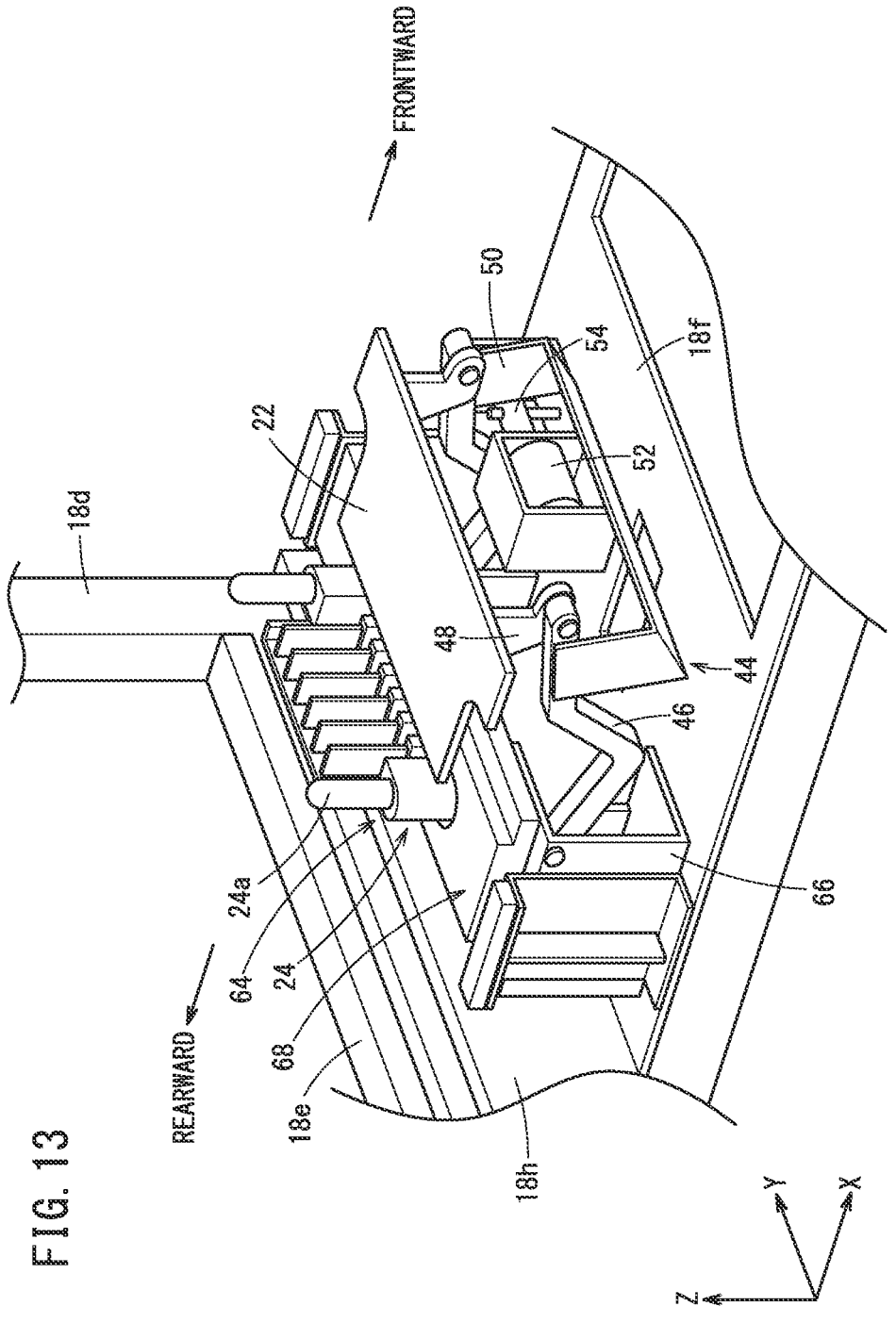
FIG. 13 is a perspective view of the shutter and the shutter drive mechanism.

FIGS. 11, 12, and 13 are perspective views of the shutter 22 and the shutter drive mechanism 44. In order to make it easier to visualize the movement of the shutter 22 and the shutter drive mechanism 44, in FIGS. 11, 12, and 13, the battery tray 16 is not shown. FIG. 11 is a view showing a state of the shutter 22 and the shutter drive mechanism 44 when the battery tray 16 is in the forwardly inclined state as shown in FIGS. 5 and 6. FIG. 12 is a view showing a state in which the battery tray 16 is being rotated to the rearward side as shown in FIG. 7. FIG. 13 is a view showing a state in which the battery tray 16 is pushed inwardly to the rearward side as shown in FIG. 8.

The shutter drive mechanism 44 includes first link arms 46, second link arms 48, and a connecting link 50. The first link arms 46 are rod-shaped members that are bent at two locations, one ends of which are rotatably supported by a later-described connector bracket 66. The second link arms 48 are members that are bent in an L-shape, one ends of which are rotatably connected to other ends of the first link arms 46, and other ends of which are fixed to the frontward side of the shutter 22. Two of the first link arms 46 and two of the second link arms 48 are disposed at a distance from each other in the Y-axis direction. The connecting link 50 is disposed between the first link arm 46 on a negative side in the Y-axis direction and the first link arm 46 on a positive side in the Y-axis direction. Due to the provision of the connecting link 50, movement of the first link arm 46 on the negative side in the Y-axis direction and movement of the first link arm 46 on the positive side in the Y-axis direction can be operated in conjunction with each other. The one ends of the first link arms 46 may be connected to either the lower panel 18f or the lower frames 18a and 18b. The first link arms 46 and the second link arms 48 correspond to connecting portions of the present invention.

The shutter 22 is a plate-shaped member, and as shown in FIGS. 5, 6, 7, and 8, is slidably accommodated inside a slit 16m that is formed in the bottom part 16a of the battery tray 16. When the shutter 22 is positioned on the rearward side of the slit 16m, the connector hole 16b is placed in a closed state. Further, when the shutter 22 is positioned on the frontward side of the slit 16m, the connector hole 16b is placed in an open state. In the state in which the connector hole 16b is closed, the shutter 22 may block the entirety of the connector hole 16b, or the shutter 22 may block only a portion of the connector hole 16b.

The shutter drive mechanism 44 moves in following relation with the rotation of the battery tray 16. At this time, due to a combination of the movement of the first link arms 46 and the movement of the second link arms 48, the other ends of the second link arms 48 cause the shutter 22 to slide and undergo movement to the forward side or to the rearward side within the slit 16m.

[Bottom Tray Locking Mechanism]

FIG. 14 is a perspective view of the battery holder 14. FIG. 14 shows a state in which the mobile battery 12 has been pushed inwardly to the rearward side. The bottom tray locking mechanism 26 includes a solenoid 52 (see FIG. 11), a solenoid pin 54, and a pin engaging member 56. The solenoid 52 is installed on the lower panel 18f. The solenoid pin 54 is provided to be capable of moving in the Y-axis direction by the solenoid 52. The pin engaging member 56 is disposed so as to extend downwardly of the battery tray 16 from the bottom part 16a of the battery tray 16. A pin hole 56a is formed at a distal end of the pin engaging member 56.

When current is not being supplied to the solenoid 52, the solenoid pin 54 is urged by a non-illustrated spring toward the positive side in the Y-axis direction. As shown in FIG. 14, in a state in which the mobile battery 12 is pushed inwardly to the rearward side, the distal end of the solenoid pin 54 is inserted into the pin hole 56a of the pin engaging member 56. Consequently, the battery tray 16 is locked by the bottom tray locking mechanism 26, and displacement of the battery tray 16 so as to rotate to the frontward side is restricted.

When the user receives the mobile battery 12 from the battery exchanging machine 10, current is supplied to the solenoid 52. Because the energized solenoid 52 pulls the solenoid pin 54 to the negative side in the Y-axis direction, the distal end of the solenoid pin 54 is released from the pin hole 56a of the pin engaging member 56. Consequently, locking of the battery tray 16 by the bottom tray locking mechanism 26 is released, and the battery tray 16 becomes capable of being rotated to the frontward side. The bottom tray locking mechanism 26 corresponds to another regulating unit of the present invention.

[Battery Locking Mechanism]

The battery locking mechanism 58 includes a first battery guide 60. The first battery guide 60 is fixed to the upper side panel 18g. The first battery guide 60 corresponds to a withdrawal regulating unit of the present invention.

The first battery guide 60 includes battery engagement and locking members 60a that extend from the upper side panel 18g to the positive side in the X-axis direction, and a notch member 60b provided on the surface of the first battery guide 60 on the side of the upper side panel 18g. As shown in FIGS. 3, 4, and 14, the battery engagement and locking members 60a are provided at two locations separated from each other in the Y-axis direction, and the first battery guide 60 includes a space between the two battery engagement and locking members 60a. Owing to this feature, the first battery guide 60 can avoid interfering with a hand of the user when the user grasps the handle 12a of the mobile battery 12 and pushes the mobile battery 12 inwardly to the rearward side. The notch member 60b is formed by partially cutting out an upper part of the first battery guide 60. Due to the notch member 60b, the first battery guide 60 is able to avoid interfering with the gas spring 28 of the battery holder 14 that is disposed upwardly of the first battery guide 60.

Figure 15:
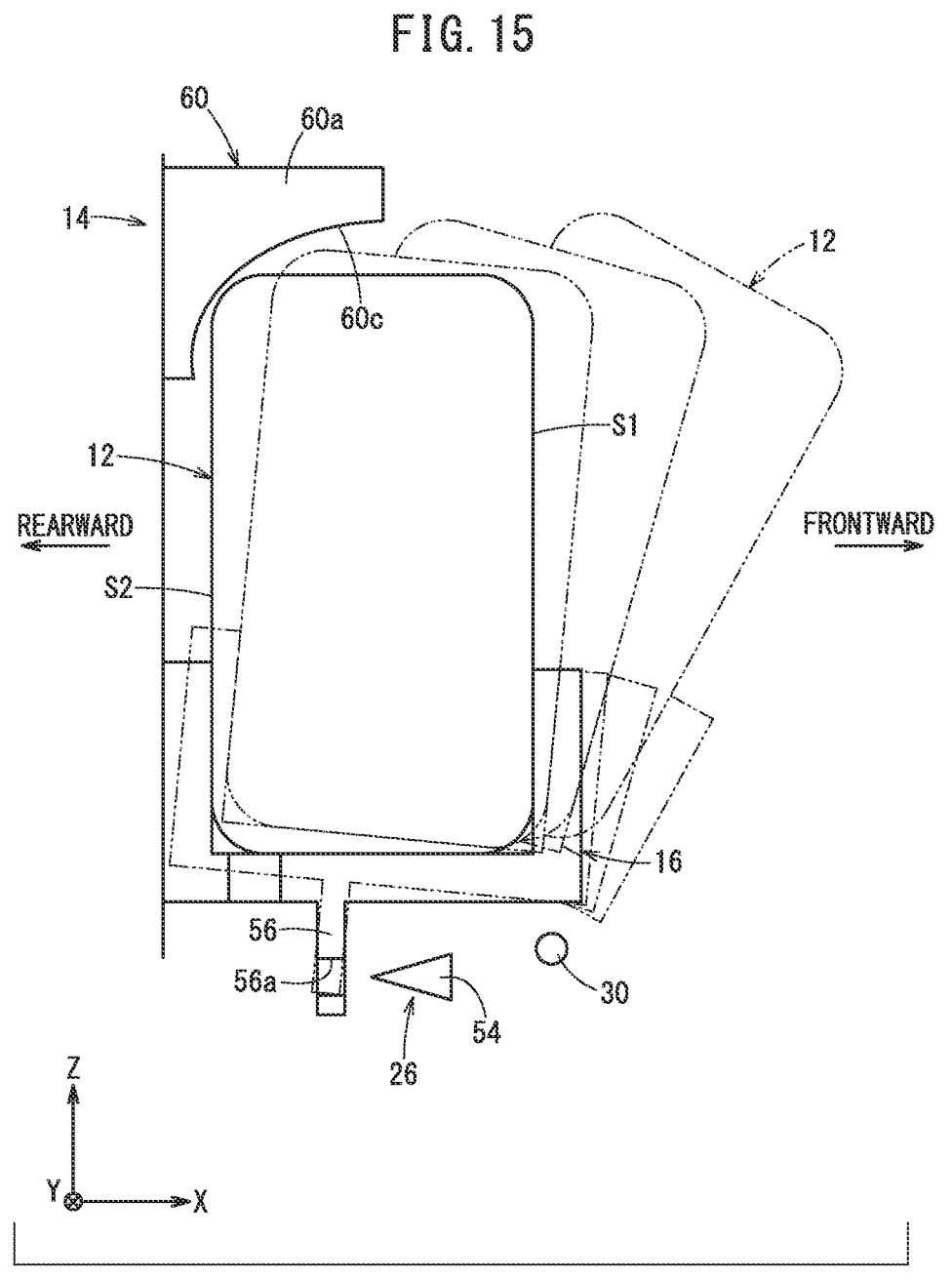
Figure 16:
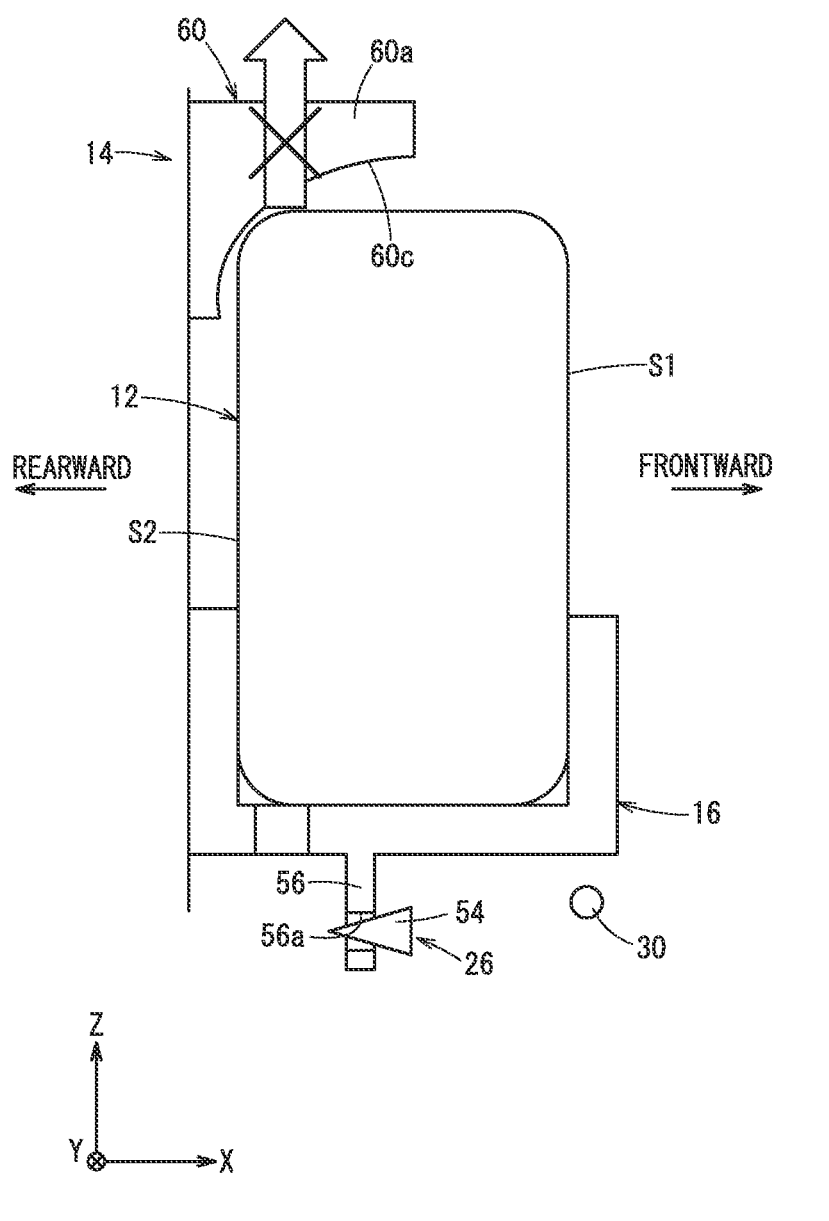
FIG. 16 is a schematic diagram of the battery holder.

FIGS. 15 and 16 are schematic diagrams of the battery holder 14. FIG. 15 shows a trajectory of the mobile battery 12 from the forwardly inclined state to a state of being pushed inwardly to the rearward side. In FIG. 16, a view is shown of a state in which the mobile battery 12 has been pushed inwardly to the rearward side.

As shown in FIG. 15, the battery engagement and locking members 60a of the first battery guide 60 include curved surface portions 60c that are formed in a shape along a trajectory of rotation of an upper end part of the mobile battery 12. Due to the curved surface portions 60c, the battery engagement and locking members 60a can avoid interfering with the mobile battery 12 when the mobile battery 12 is pushed inwardly to the rearward side from the forwardly inclined state. Further, as shown in FIG. 16, in a state in which the mobile battery 12 is pushed inwardly to the rearward side, the curved surface portions 60c are formed in a shape of being in close proximity upwardly of a corner portion on a negative side in the X-axis direction of the upper surface of the mobile battery 12.

As shown in FIG. 4, when the mobile battery 12 is inserted into the battery tray 16, the mobile battery 12 is supported by a jaw part of the edge portion 16c and a jaw part of the stepped portion 16g of the battery tray 16, whereby rattling inside the battery tray 16 is suppressed. In a state in which the battery tray 16 is locked by the bottom tray locking mechanism 26, in order to remove the mobile battery 12 from the battery tray 16, the user is required to pull the mobile battery 12 upward. However, since the mobile battery 12 interferes with the battery engagement and locking members 60a that are located upwardly thereof, the user cannot pull the mobile battery 12 upward, and is incapable of removing the mobile battery 12 from the battery tray 16.

On a negative side in the Z-axis direction of the battery locking mechanism 58, a battery pad 62 is fixed to the upper side panel 18g. The battery pad 62 abuts against the side surface S2 of the mobile battery 12, in a state in which the mobile battery 12 is pushed inwardly to the rearward side. Consequently, even if the user attempts to push the mobile battery 12 further inward, displacement of the mobile battery 12 so as to rotate to the rearward side can be restricted.

As shown in FIG. 14, the battery engagement and locking members 60a of the first battery guide 60 include sideways regulating units 60d which are formed so as to extend in a wraparound manner of the upper part of the mobile battery 12, in a state in which the mobile battery 12 is pushed inwardly to the rearward side. The sideways regulating units 60d are capable of restricting displacement of the mobile battery 12 so as to be tilted in a direction (the Y-axis direction) in which the rotary shaft 30 extends, and can prevent the mobile battery 12 from being withdrawn from the battery tray 16.

[Connector Unit]

As shown in FIG. 3, a connector unit 64 is provided on the connector bracket 66. The connector bracket 66 is fixed to a more negative side in the X-axis direction than a central portion of the lower panel 18f, and is installed so as to project out from the lower panel 18f in a positive direction in the Z-axis direction. The connector bracket 66 may also be fixed to the lower frames 18a and 18b.

Figure 17:
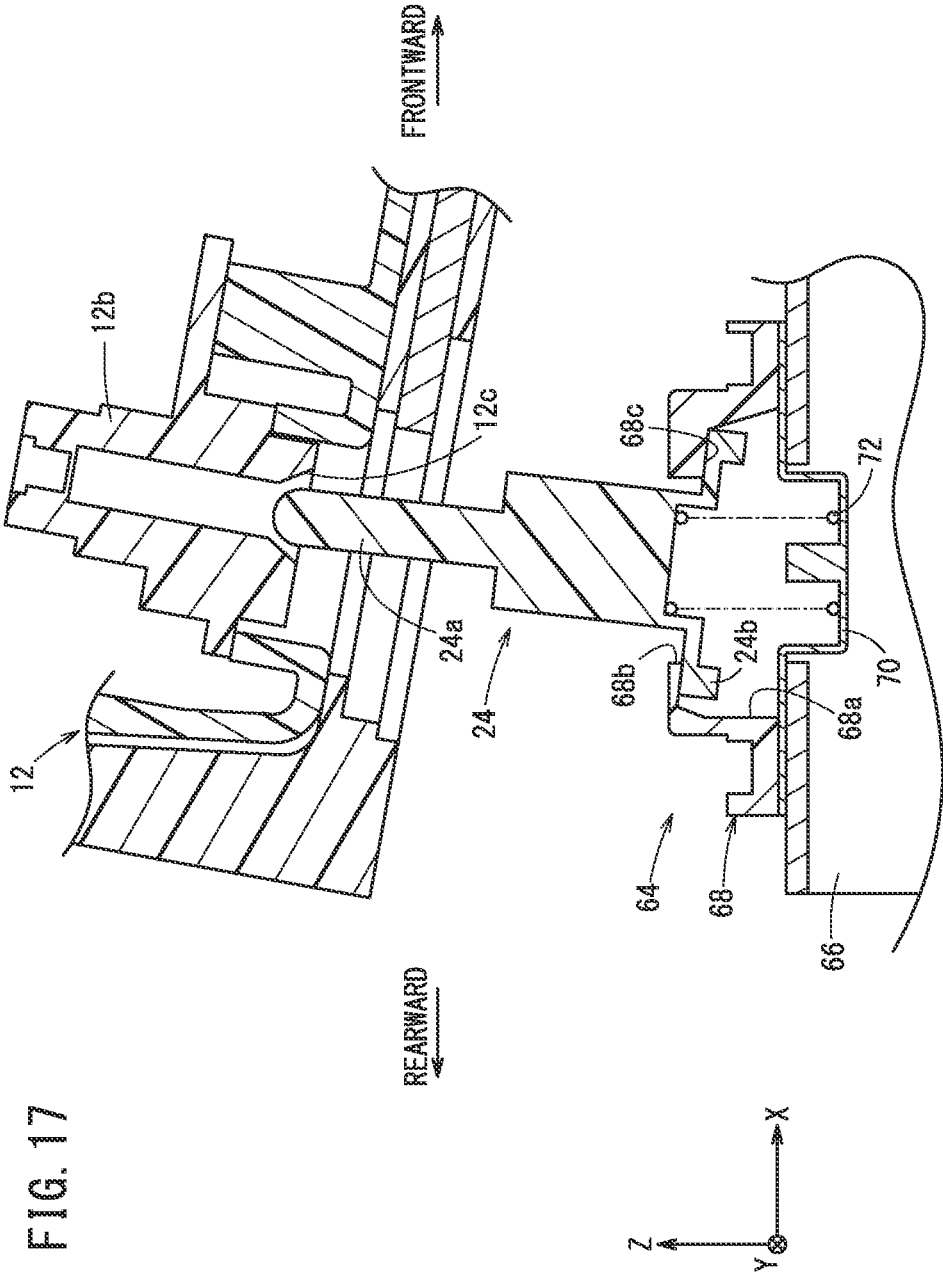
FIG. 17 is a cross-sectional view of a portion of a connector unit of the battery holder.

FIGS. 17 and 18 are cross-sectional views of a portion of the connector unit 64 of the battery holder 14. FIG. 17 shows a state prior to the connector 24 of the connector unit 64 being inserted into the connector 12b of the mobile battery 12. FIG. 18 shows a state after insertion of the connector 24 into the connector 12b has been completed. The connector 12b of the mobile battery 12 corresponds to a first terminal of the present invention, and the connector 24 of the connector unit 64 corresponds to a second terminal of the present invention.

The connector unit 64 includes the connector 24, a connector holder 68, a spring bearing surface member 70, and a coil spring 72.

The connector holder 68 includes a connector accommodating unit 68a, a communication hole 68b that allows the connector accommodating unit 68a to communicate with the exterior, and an inclined surface 68c formed on an outer periphery of the communication hole 68b of the connector accommodating unit 68a. The inclined surface 68c is formed so as to be forwardly inclined toward the frontward side.

The connector 24 includes the connector pin 24a that penetrates through the communication hole 68b from the side of the connector accommodating unit 68a and is exposed to the exterior, and a flange portion 24b that abuts against the inclined surface 68c and prevents the connector 24 from being removed from the communication hole 68b.

The spring bearing surface member 70 is disposed on a negative side in the Z-axis direction of the connector holder 68, and the connector accommodating unit 68a is closed by the spring bearing surface member 70. The coil spring 72 is disposed between the spring bearing surface member 70 and the connector 24. The coil spring 72 urges the connector 24 so as to press the flange portion 24b of the connector 24 against the inclined surface 68c of the connector holder 68.

In a state where the flange portion 24b of the connector 24 is pressed against the inclined surface 68c of the connector holder 68, as shown in FIG. 17, the connector 24 is forwardly inclined toward the frontward side. As shown in FIG. 17, in such a forwardly inclined state, the mobile battery 12 is placed in close proximity to the connector 24, and the connector pin 24a of the forwardly inclined connector 24 is inserted into the connector 12b of the mobile battery 12. When the connector pin 24a is inserted into the connector 12b, a major portion of the force that acts on the connector pin 24a from the connector 12b can be oriented in the direction in which the connector pin 24a extends. Therefore, it is possible to reduce forces acting on the connector pin 24a in directions other than the direction in which the connector pin 24a extends. Further, the diameter of a tapered guide 12c that guides the connector pin 24a into the connector 12b can be reduced.

After the connector pin 24a has started being inserted into the connector 12b, the connector pin 24a is rotated to the rearward side in conjunction with movement of the mobile battery 12 rotating in a direction to rise upward. Since the connector 24 is supported by the spring bearing surface member 70 via the coil spring 72, it is possible to prevent an excessive force from acting on the connector pin 24a. As shown in FIG. 18, in a state in which insertion of the connector 24 into the connector 12b is completed, the connector 24 is placed in a state in which the connector pin 24a extends in the Z-axis direction.

Second Embodiment

According to the first embodiment, displacement of the battery tray 16 so as to rotate to the rearward side is restricted by the front tray locking mechanism 20. Instead of the front tray locking mechanism 20, displacement of the battery tray 16 so as to rotate to the rearward side may be restricted by a rear tray locking mechanism 74. The structure of the battery holder 14 according to the present embodiment is the same as the structure of the battery holder 14 according to the first embodiment, except that the rear tray locking mechanism 74 is used instead of the front tray locking mechanism 20 of the first embodiment. The rear tray locking mechanism 74 corresponds to a regulating unit of the present invention.

Figure 19:
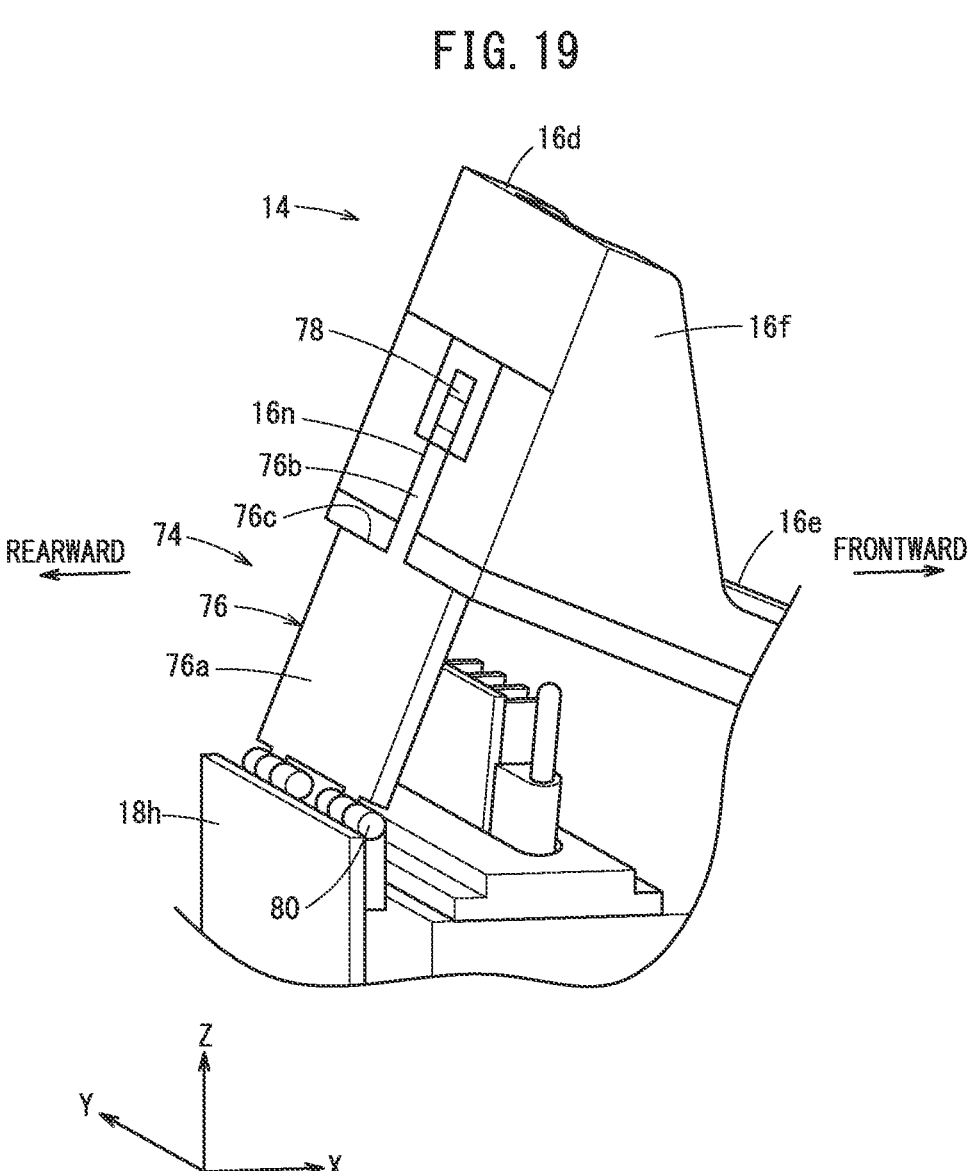
FIG. 19 is a partial perspective view of the battery holder.
Figure 20:
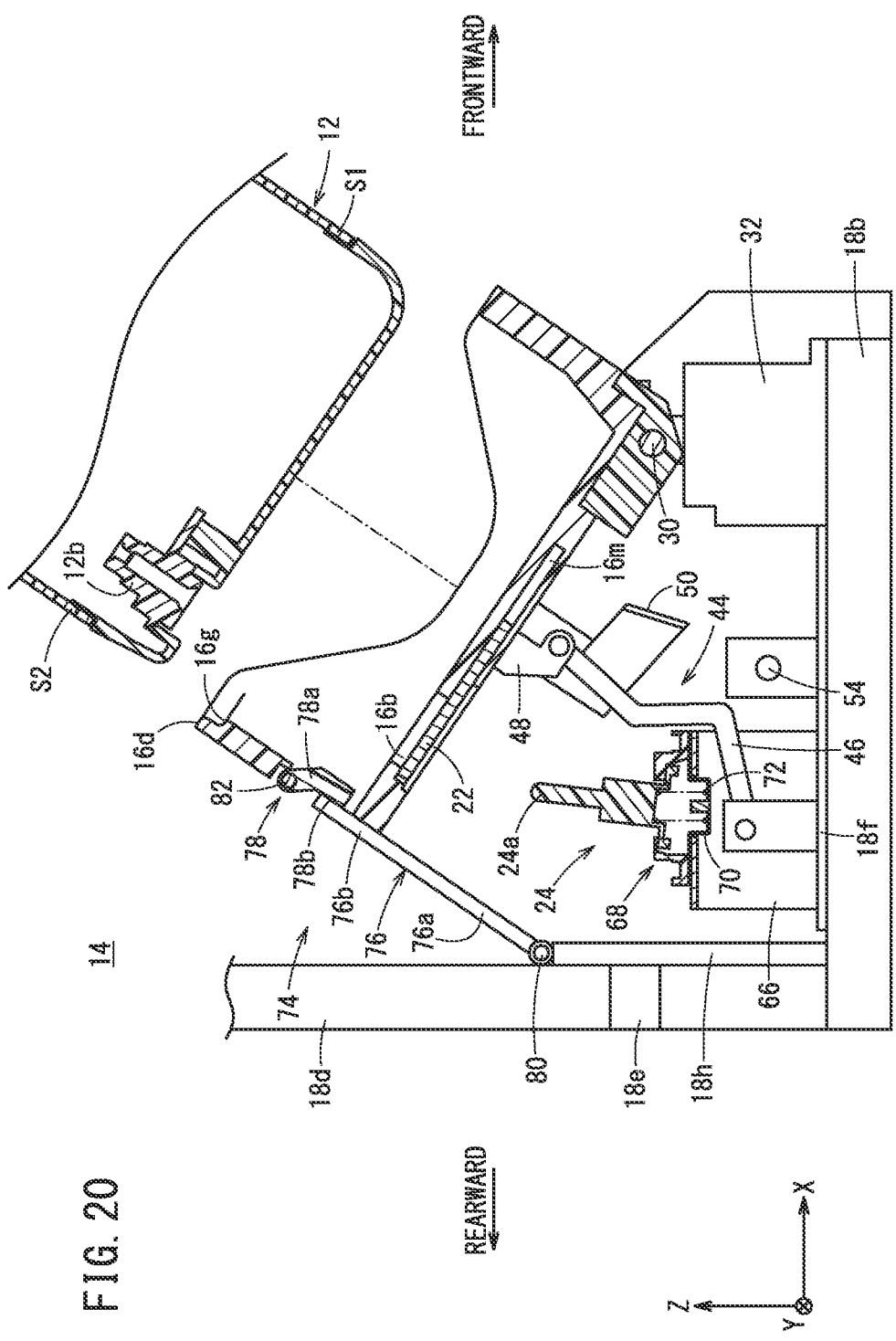
FIG. 20 is a partial cross-sectional view of the battery holder.
Figure 21:
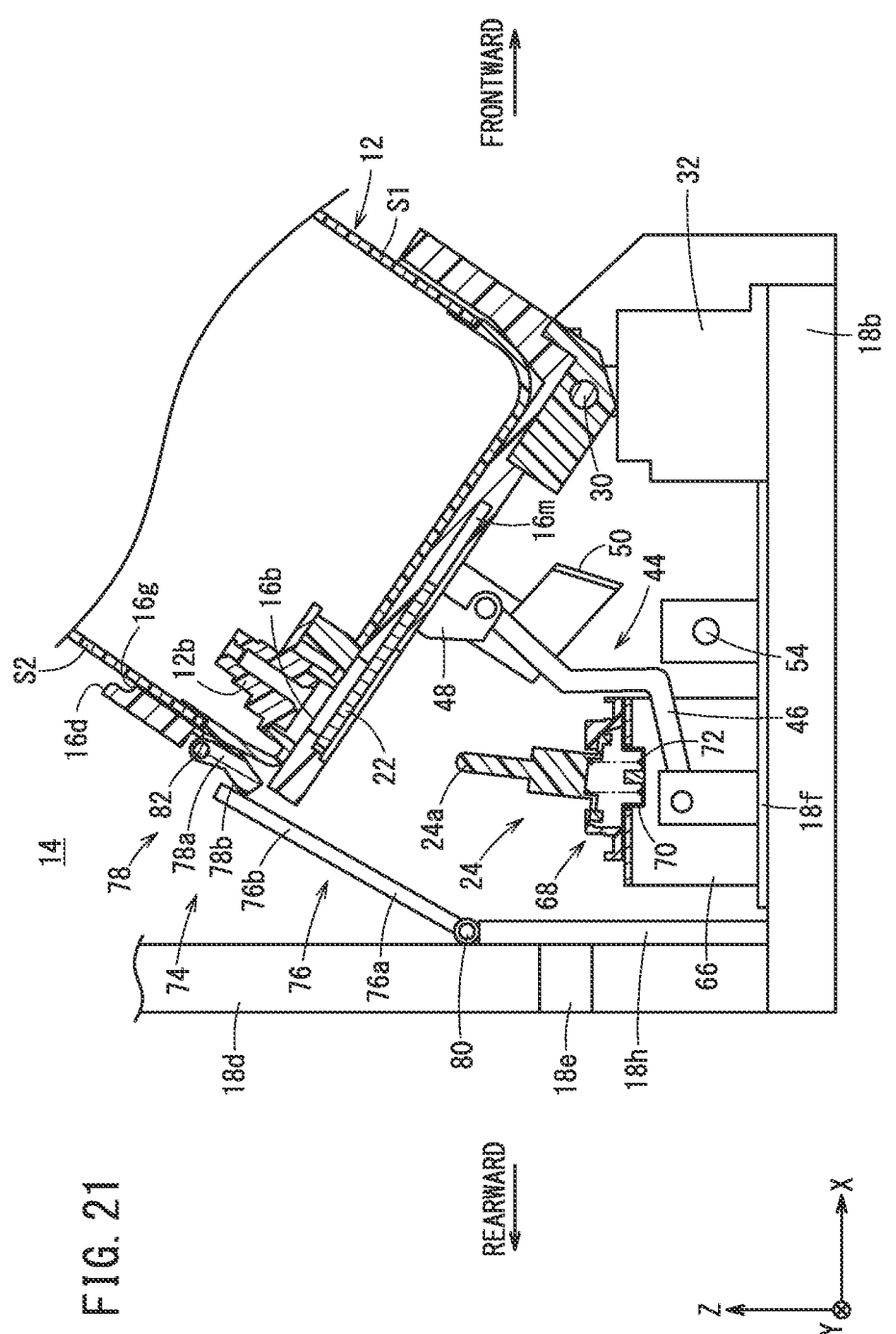
FIG. 21 is a partial cross-sectional view of the battery holder.
Figure 22:
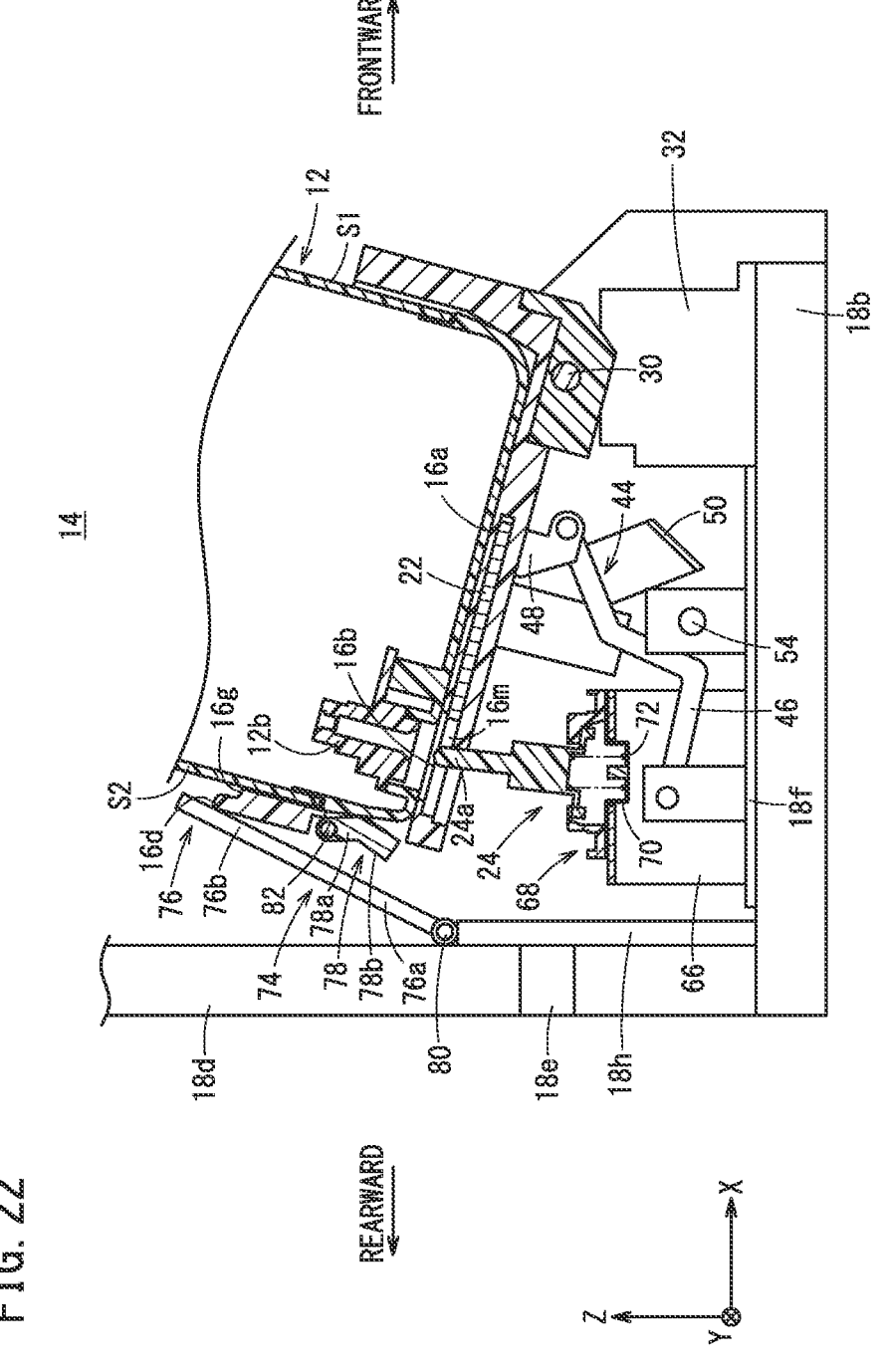
FIG. 22 is a partial cross-sectional view of the battery holder.
Figure 23:
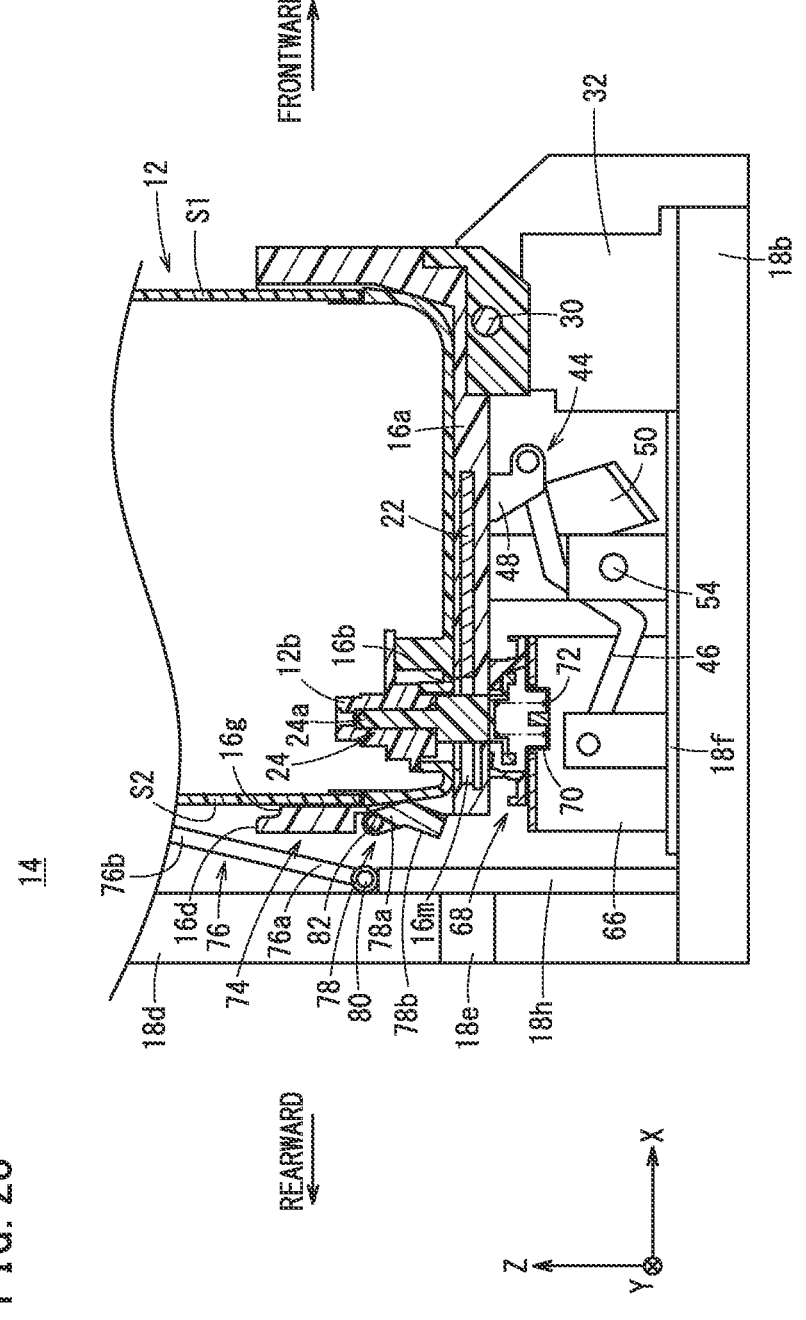
FIG. 23 is a partial cross-sectional view of the battery holder.

FIG. 19 is a partial perspective view of the battery holder 14. FIGS. 20, 21, 22, and 23 are partial cross-sectional views of the battery holder 14. FIG. 20 is a view showing a state in which the battery tray 16 is in a forwardly inclined state, and the mobile battery 12 is not placed on the battery tray 16. FIG. 21 is a view showing a state in which the battery tray 16 is in a forwardly inclined state, and the mobile battery 12 is placed on the battery tray 16. FIG. 22 is a view showing a state in which the mobile battery 12 and the battery tray 16 are being rotated to the rearward side. FIG. 23 is a view showing a state in which the mobile battery 12 and the battery tray 16 are pushed inwardly to the rearward side.

The rear tray locking mechanism 74 includes a collapsible plate 76 and a flap 78. The collapsible plate 76 is a plate-shaped member, and has a wide portion 76a, a narrow portion 76b, and a shoulder portion 76c. The collapsible plate 76 is supported on a rotary shaft 80 that is fixed to the lower side panel 18h, so as to be capable of rotating about the rotary shaft 80. The collapsible plate 76 is urged by a non-illustrated winding spring in a direction of clockwise rotation about the rotary shaft 80 shown in FIGS. 20, 21, 22, and 23. As shown in FIG. 19, the narrow portion 76b of the collapsible plate 76 is formed so as to be capable of engagement with an engagement groove 16n that is formed on the outer side surface of the edge portion 16d on the rearward side of the battery tray 16. The collapsible plate 76 corresponds to an engaging element of the present invention, and the flap 78 corresponds to an operating element of the present invention.

The flap 78 is supported by a rotary shaft 82 that is fixed to the edge portion 16d on the rearward side of the battery tray 16, so as to be capable of rotating about the rotary shaft 82. The flap 78 includes an inclined surface 78a, and a pressing surface 78b that is a surface on an opposite side of the inclined surface 78a.

In a state in which the battery tray 16 is in the forwardly inclined state, and the mobile battery 12 is not placed on the battery tray 16, as shown in FIG. 20, the narrow portion 76b of the collapsible plate 76 is engaged with the engagement groove 16n of the battery tray 16. The pressing surface 78b of the flap 78 is pressed by the narrow portion 76b of the collapsible plate 76 toward the inner side of the battery tray 16, and the inclined surface 78a of the flap 78 is positioned more toward an inner side than the inner side surface of the edge portion 16d of the battery tray 16. Consequently, a state is brought about in which the battery tray 16 is locked by the rear tray locking mechanism 74, and displacement of the battery tray 16 so as to rotate to the rearward side is restricted.

When the mobile battery 12 is placed on the battery tray 16, as shown in FIG. 21, the inclined surface 78a of the flap 78 is pressed by the side surface S1 of the mobile battery 12 toward the side of the collapsible plate 76. The pressing surface 78b of the flap 78 presses on the narrow portion 76b of the collapsible plate 76, and engagement between the narrow portion 76b and the engagement groove 16n of the battery tray 16 is released. Consequently, the battery tray 16 is placed in a state in which locking thereof by the rear tray locking mechanism 74 is released, and as shown in FIGS. 22 and 23, the battery tray 16 becomes capable of being rotated to the rearward side.

Third Embodiment

According to the first embodiment, the stepped portion 16g of the battery tray 16 prevents the mobile battery 12 from being inserted in reverse. Instead of this feature, a structure may be adopted in which, in the case that the mobile battery 12 is reversely inserted, the flaps 38 of the front tray locking mechanism 20 are incapable of being pressed by the mobile battery 12.

Figure 24:
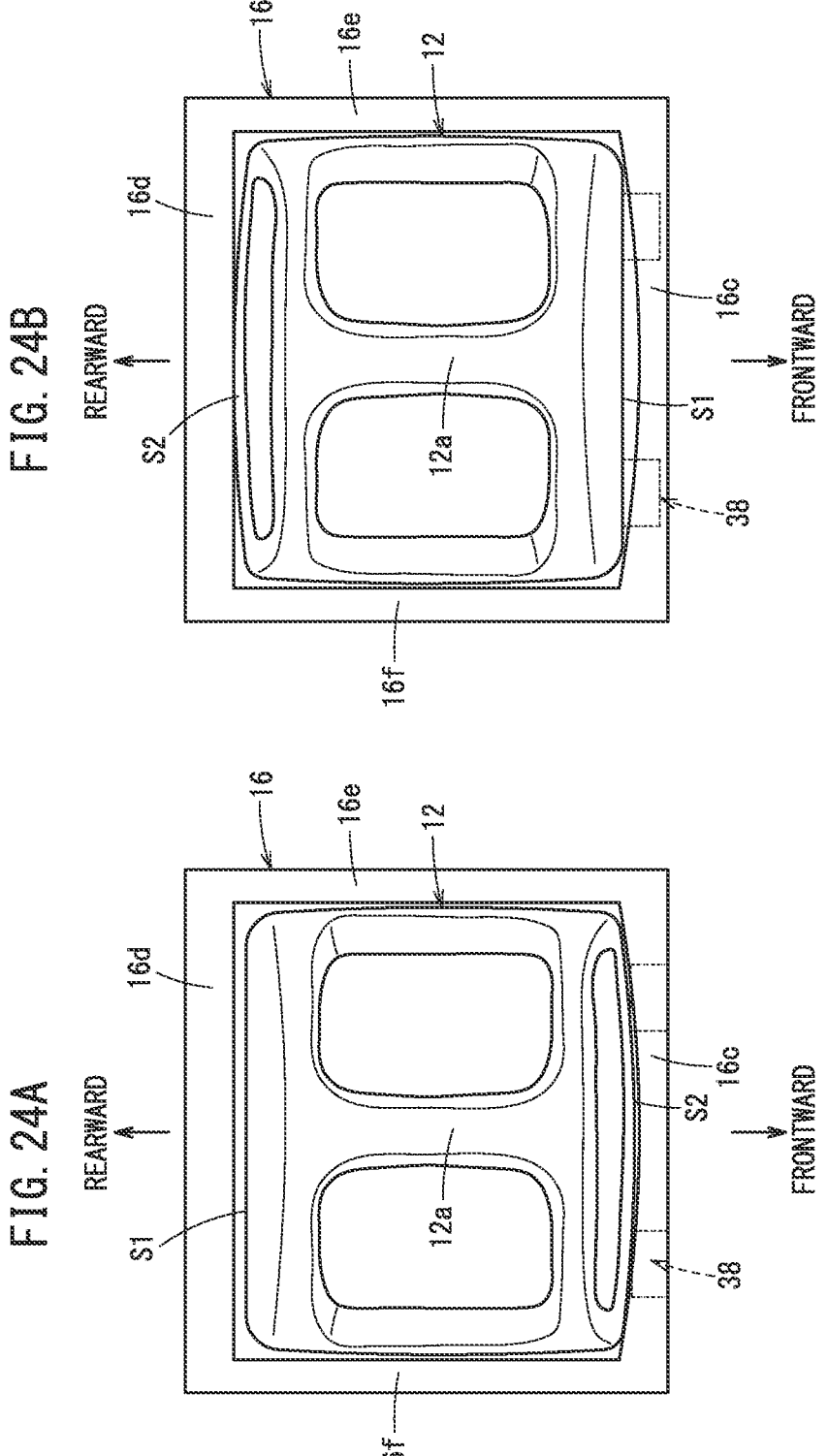
FIGS. 24A and 24B are views showing a state in which the mobile battery is inserted into the battery tray as viewed from an upper surface side of the mobile battery.

FIGS. 24A and 24B are views showing a state in which the mobile battery 12 is inserted into the battery tray 16 as viewed from an upper surface side of the mobile battery 12. FIG. 24A shows a state in which the mobile battery 12 is inserted into the battery tray 16 in a correct direction. FIG. 24B shows a state (a reversely inserted state) in which the mobile battery 12 is inserted into the battery tray 16 in an incorrect direction. Moreover, in this instance, a direction in which the side surface S2 of the mobile battery 12 faces toward the frontward side is taken to be the correct direction.

The shape of the inner side surface of the edge portion 16c on the frontward side of the battery tray 16 is formed in a shape that follows along a curved surface of the side surface S2 of the mobile battery 12.

In the case that the mobile battery 12 is inserted into the battery tray 16 with the side surface S2 facing toward the frontward side, as shown in FIG. 24A, the flaps 38 of the front tray locking mechanism 20 can be pressed by the side surface S2 of the mobile battery 12. Consequently, locking by the front tray locking mechanism 20 is released, and the battery tray 16 can be rotated to the rearward side.

On the other hand, in the case that the mobile battery 12 is inserted into the battery tray 16 with the side surface S1 facing toward the frontward side, as shown in FIG. 24B, the flaps 38 of the front tray locking mechanism 20 cannot be pressed by the side surface S1 of the mobile battery 12. Consequently, locking by the front tray locking mechanism 20 is not released, and displacement of the battery tray 16 so as to rotate to the rearward side is restricted.

Fourth Embodiment

Figure 25:
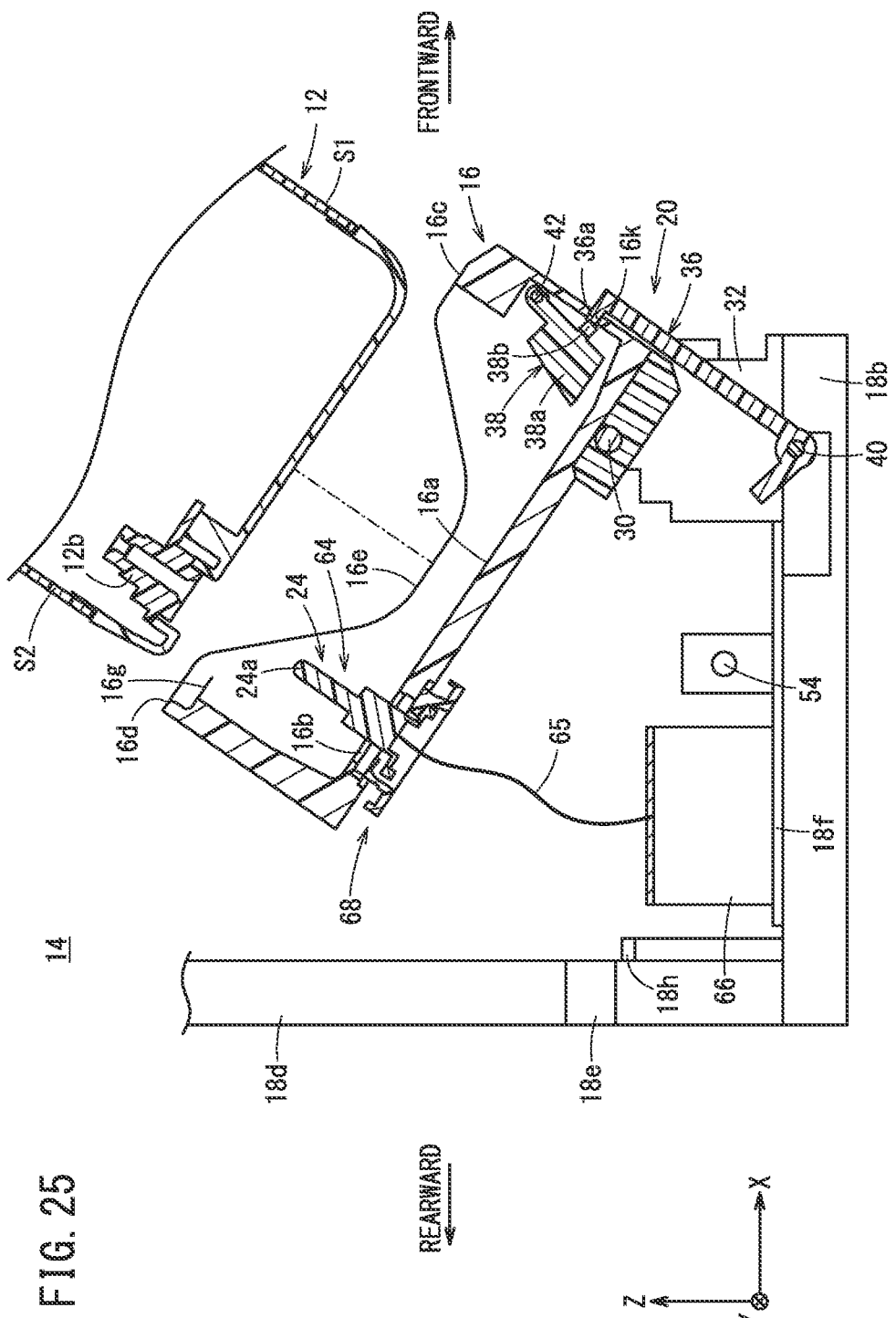
FIG. 25 is a partial cross-sectional view of the battery holder.

FIG. 25 is a partial cross-sectional view of the battery holder 14. FIG. 25 is a view showing a state in which the battery tray 16 is in a forwardly inclined state, and the mobile battery 12 is not placed on the battery tray 16.

According to the first embodiment, the connector unit 64 is installed on the connector bracket 66 that is fixed to the lower panel 18f. Instead of this feature, as shown in FIG. 25, the connector unit 64 may be installed on the bottom part 16a of the battery tray 16. Electrical wiring 65 is connected between the connector unit 64 and the connector bracket 66.

Fifth Embodiment

In the first embodiment, in a state in which the mobile battery 12 is set in the slot 10a, the longitudinal direction of the mobile battery 12 is substantially parallel to the vertical direction (the direction of gravity, the upper-lower direction). Such a feature may be modified so that, in a state in which the mobile battery 12 is set in the slot 10a, the mobile battery 12 assumes a posture in which the longitudinal direction thereof is oriented a few degrees to the rearward side relative to the vertical direction (the direction of gravity, the upper-lower direction). Consequently, it is possible to prevent the mobile battery 12 from projecting out from the opening 10d of the battery exchanging machine 10.

Sixth Embodiment

In the first embodiment, the battery holders 14 are installed in each of the slots 10a of the battery exchanging machine 10. Instead of the battery exchanging machine 10, the battery holders 14 may be installed in each of respective slots 90c of a stationary battery power supply device 90.

Figure 26:
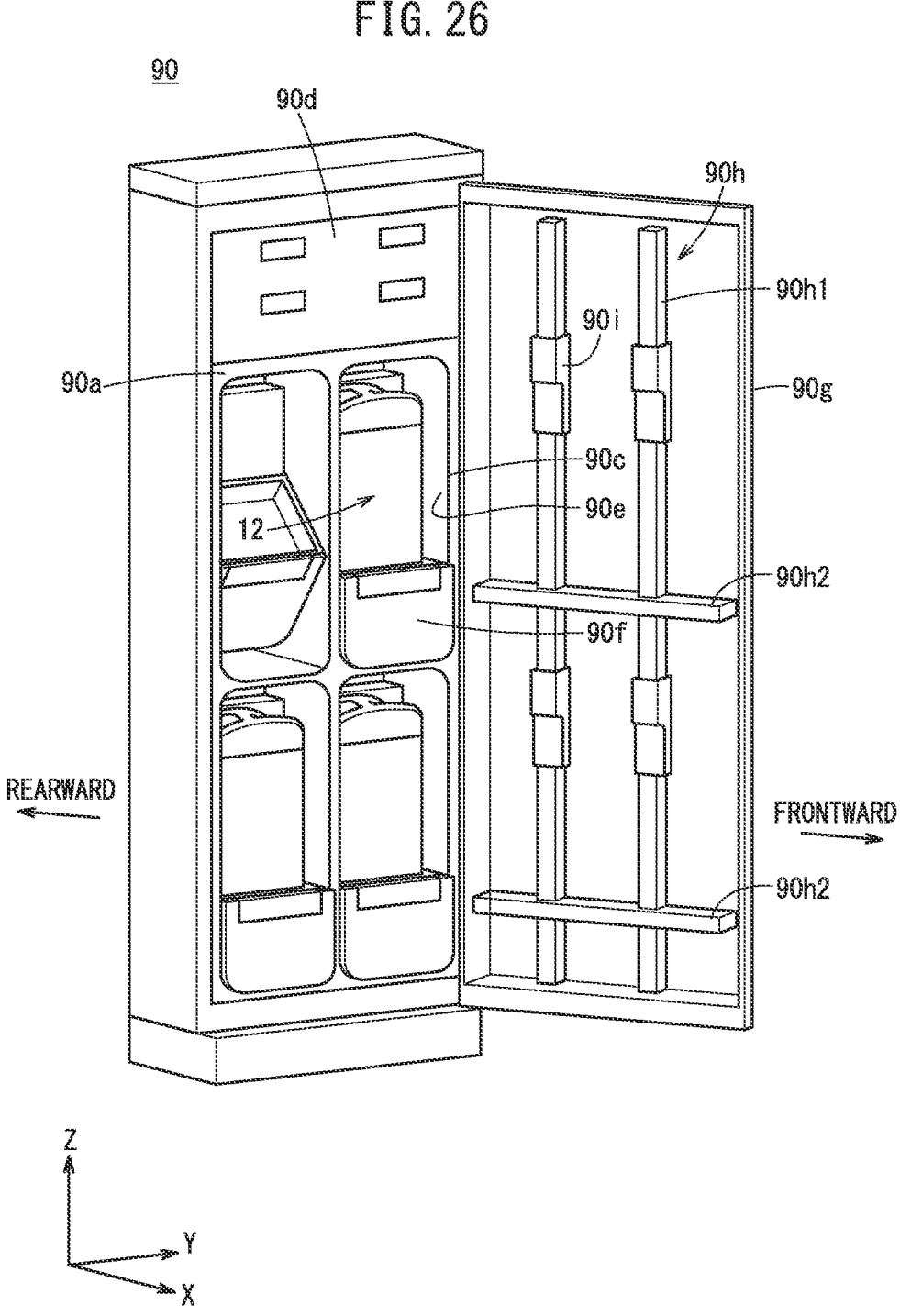
FIG. 26 is a schematic diagram of a stationary battery power supply device.
Figure 27:
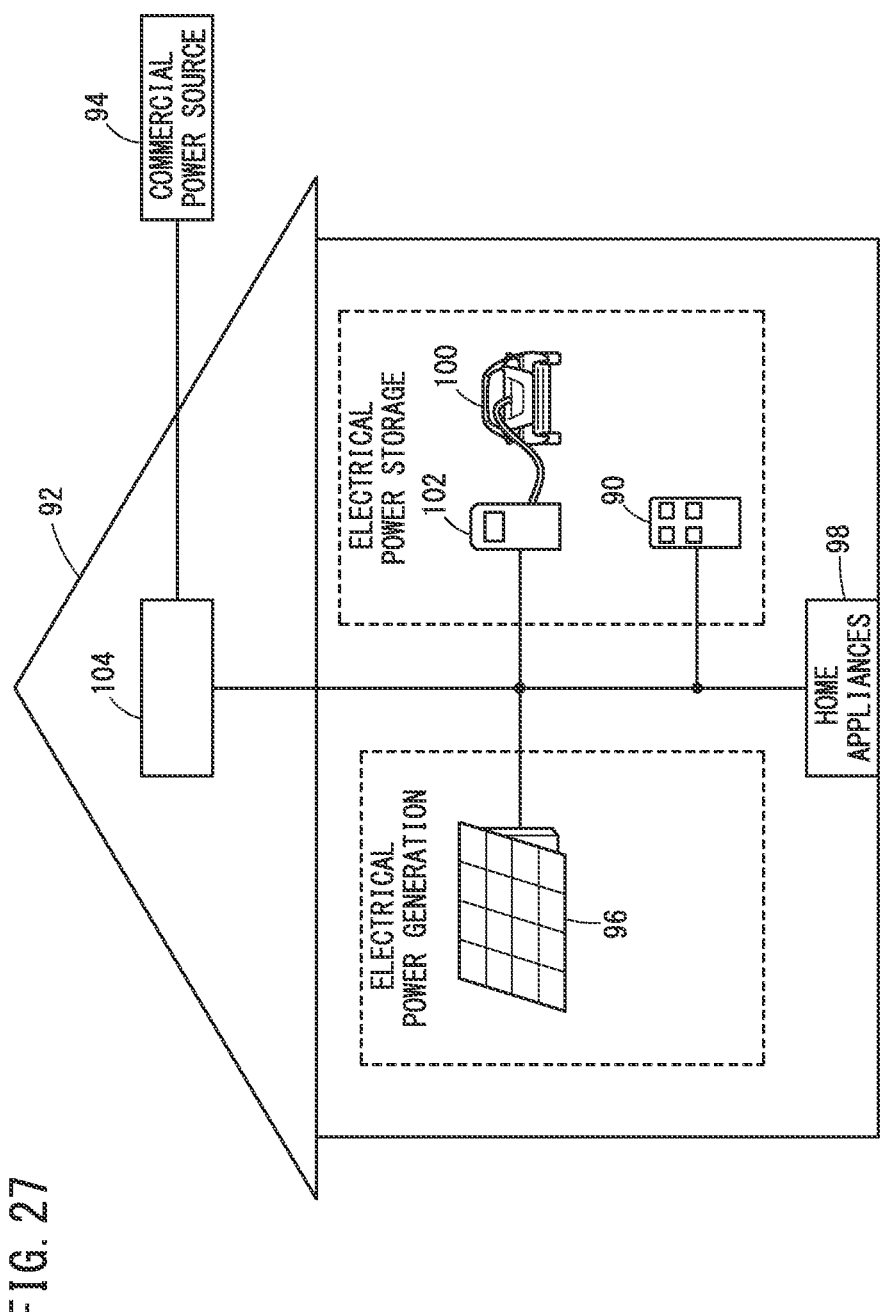
FIG. 27 is a schematic diagram illustrating an example of using the stationary battery power supply device.

FIG. 26 is a schematic diagram of the stationary battery power supply device 90. FIG. 27 is a schematic diagram illustrating an example of using the stationary battery power supply device 90.

The stationary battery power supply device 90 is a device in which the mobile batteries 12 are accommodated in the interior thereof, and which carries out charging of the mobile batteries 12. The stationary battery power supply device 90 corresponds to a holding device of the present invention.

As shown in FIG. 27, the stationary battery power supply device 90 is installed in a residence 92 and is used as one portion of an electrical power storage device of the residence 92. The stationary battery power supply device 90 charges the mobile batteries 12 with electrical power supplied from a commercial power source 94, or alternatively, with electrical power supplied from a solar power generating apparatus 96. The stationary battery power supply device 90 supplies the electrical power stored in the mobile batteries 12 to home appliances 98 inside the residence 92.

As an electrical power storage device of the residence 92, in addition to the stationary battery power supply device 90, an automobile 100 (a hybrid automobile or an electric vehicle) having a non-illustrated drive source battery is used. By being connected to an automobile power supply manager 102 installed in the residence 92, the automobile 100 functions as an electrical power storage device together with the automobile power supply manager 102. The automobile power supply manager 102 charges the drive source battery of the automobile 100 by way of the electrical power supplied from the commercial power source 94, or alternatively, the electrical power supplied from the solar power generating apparatus 96. The automobile power supply manager 102 supplies the electrical power stored in the drive source battery to the home appliances 98 inside the residence 92.

An integrated power supply manager 104 is installed in the residence 92. The integrated power supply manager 104 manages an amount of electricity generated by the solar power generating apparatus 96, an amount of electricity stored in the mobile batteries 12 of the stationary battery power supply device 90, and an amount of electricity stored in the drive source battery of the automobile 100, and controls the amount of electrical power supplied to the residence 92 from the commercial power source 94. Further, the integrated power supply manager 104 manages the amount of electricity generated by the solar power generating apparatus 96, the amount of electricity stored in the mobile batteries 12 of the stationary battery power supply device 90, and the amount of electricity stored in the drive source battery of the automobile 100, and controls the amount of electrical power supplied to the commercial power source 94 from the residence 92.

Among the mobile batteries 12 accommodated in the stationary battery power supply device 90, the user exchanges a mobile battery 12, the degree of degradation (e.g., SOH: state of health) of which has become high due to repeated charging and discharging, with a mobile battery 12 whose degree of degradation is low. Therefore, the frequency of inserting and taking out the mobile batteries 12 of the stationary battery power supply device 90 is lower, as compared to the frequency of inserting and taking out the mobile batteries 12 of the battery exchanging machine 10 according to the first embodiment.

In the battery exchanging machine 10 according to the first embodiment, the front surface 10c is inclined rearwardly with respect to the vertical direction (the direction of gravity). In contrast thereto, in the stationary battery power supply device 90, the front surface 90a is formed substantially in parallel with the vertical direction (the direction of gravity). Consequently, although the ease with which the mobile batteries 12 are inserted and taken out by the user in the stationary battery power supply device 90 is somewhat lower than the ease with which the mobile batteries 12 are inserted and taken out by the user in the battery exchanging machine 10, the depth dimension of the stationary battery power supply device 90 can be made smaller.

In the foregoing, although an example has been described of the stationary battery power supply device 90 which is installed in the residence 92, the stationary battery power supply device 90 is not limited to being installed in the residence 92, but may also be installed in a business establishment, a public facility, or the like.

Hereinafter, a description will be given concerning a configuration of the stationary battery power supply device 90 based on an X-axis, a Y-axis, and a Z-axis, which are defined in the following manner. A depth direction of the stationary battery power supply device 90 is defined as an X-axis direction, and the side of the front surface 90a is defined as a positive side. A width direction of the stationary battery power supply device 90 is defined as a Y-axis direction, and a right side when the stationary battery power supply device 90 is viewed from a position facing toward the front surface 90a is defined as a positive side. An upper-lower direction of the stationary battery power supply device 90 is defined as a Z-axis direction, and an upper side thereof is defined as a positive side. Further, a side of the front surface 90a of the stationary battery power supply device 90 may be defined as a frontward side, and a side of a rear surface 90b thereof may be defined as a rearward side.

As shown in FIG. 26, the stationary battery power supply device 90 includes four slots 90c and a single operation panel 90d. The mobile batteries 12 are set in the respective slots 90c. Openings 90e are formed in the front surface 90a of the stationary battery power supply device 90 at positions corresponding to each of the slots 90c, and the mobile batteries 12 are inserted into and taken out from the openings 90e. The battery holder 14 including the battery tray 16 is installed inside each of the slots 90c. The configuration of the battery holder 14 is the same as the configuration of the battery holder 14 according to the first embodiment.

FIG. 28 is an enlarged view of the operation panel 90d. FIG. 29 is an enlarged view of portions of the four slots 90c.

Four unlocking buttons 90d1 corresponding to each of the slots 90c are provided on the operation panel 90d. When the user operates one of the unlocking buttons 90d1, the bottom tray locking mechanism 26 (see FIG. 14) of the battery holder 14 of the slot 90c corresponding to the operated unlocking button 90d1 is released. Consequently, the mobile battery 12 is slowly tilted forward together with the battery tray 16. The user grasps the handle 12a of the mobile battery 12, removes the mobile battery 12 from the battery tray 16, and takes out the mobile battery 12 from the stationary battery power supply device 90.

A decorative plate 90f is attached to the frontward side of the battery tray 16. The decorative plate 90f rotates together with the battery tray 16.

Figure 30:
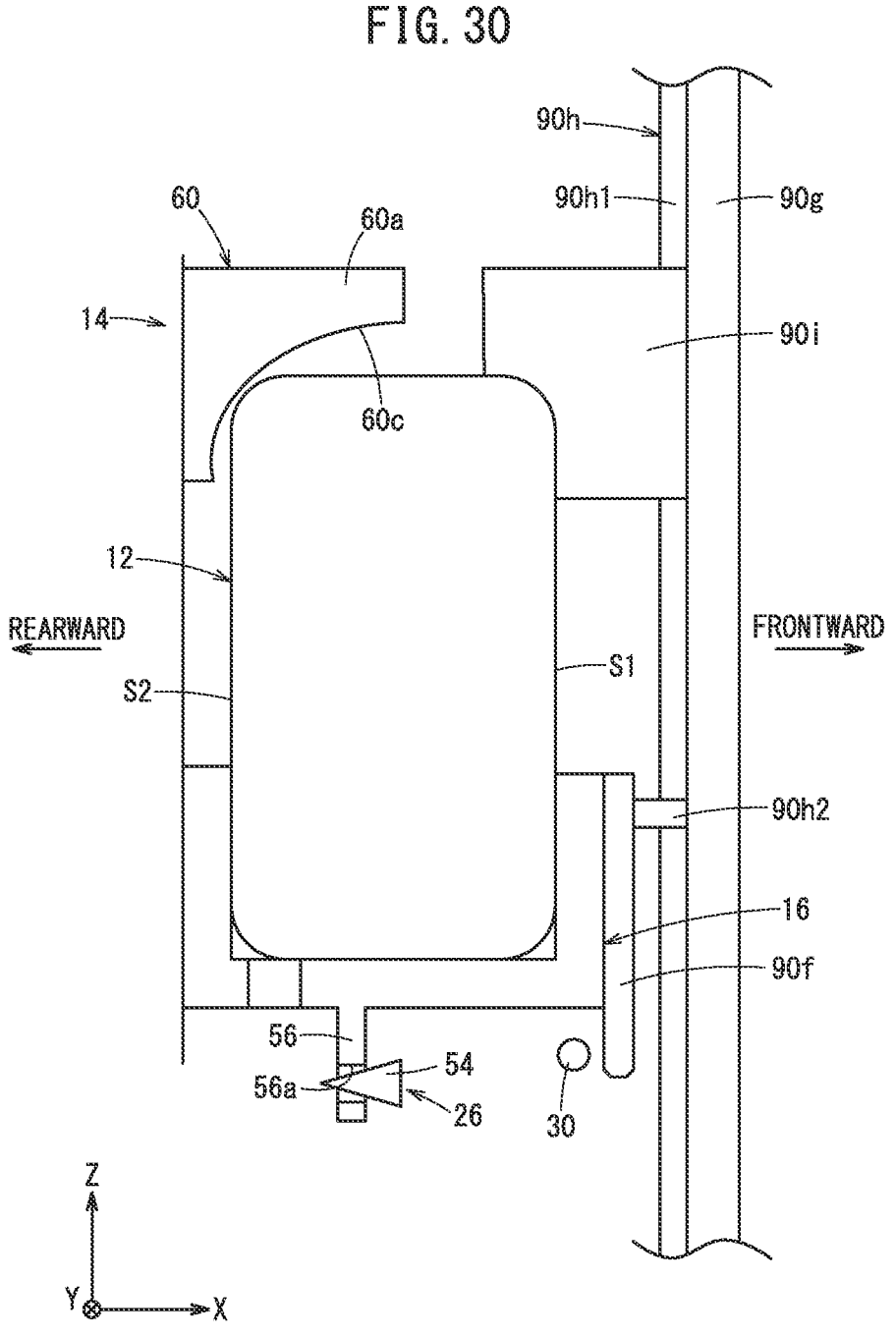
FIG. 30 is a schematic cross-sectional view of a battery holder and a door member.

As shown in FIG. 26, a door member 90g is provided on the front surface 90a of the stationary battery power supply device 90. FIG. 30 is a schematic cross-sectional view of the battery holder 14 and the door member 90g. FIG. 30 shows a state in which the door member 90g is closed.

As shown in FIG. 30, in a state in which the door member 90g is closed, reinforcing ribs 90h and second battery guides 90i are provided on a surface on the rearward side of the door member 90g. As shown in FIG. 26, the reinforcing ribs 90h include vertically directed ribs 90h1 extending in the upper-lower direction (the Z-axis direction), and a laterally directed rib 90h2 that extends in a direction perpendicular to the vertically directed ribs 90h1. Owing to these features, strength is assured while enabling a reduction in weight of the door member 90g.

The second battery guides 90i are disposed in an overlapping manner on the vertically directed ribs 90h1. As shown in FIG. 26, the second battery guides 90i are disposed at positions corresponding to the upper parts of the mobile batteries 12 that are set in each of the slots 90c. As shown in FIG. 30, in a state in which the door member 90g is closed, the second battery guides 90i are formed so as to extend to the rearward side from the door member 90g.

When the battery tray 16 is pushed inwardly to the rearward side and is positioned in the first position, the second battery guide 90i restricts the forward tilting displacement of the mobile battery 12. Consequently, it is possible to prevent the mobile battery 12 from being withdrawn from the battery tray 16. Further, when vibrations act on the stationary battery power supply device 90, the mobile batteries 12 are prevented from undergoing movement inside the stationary battery power supply device 90, and a situation can be avoided in which the connectors 12b become disconnected from the connectors 24, or the electrical wiring is short-circuited or the like. Further, in a state in which the mobile battery 12 is withdrawn from the battery tray 16, when the door member 90g is closed, the battery tray 16 and the second battery guide 90i interfere with each other. Therefore, the door member 90g cannot be completely closed, and the user is capable of recognizing that the mobile battery 12 is in a state of having been withdrawn from the battery tray 16. The second battery guide 90i corresponds to another withdrawal regulating unit of the present invention.

Figure 31A:
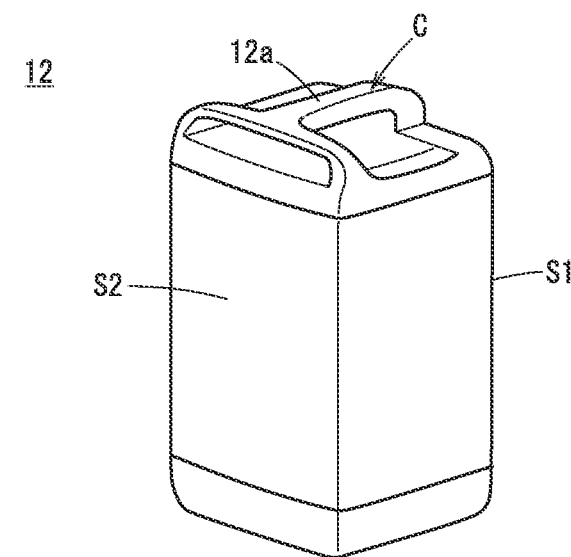
FIGS. 31A and 31B are perspective views of the mobile battery.
Figure 31B:
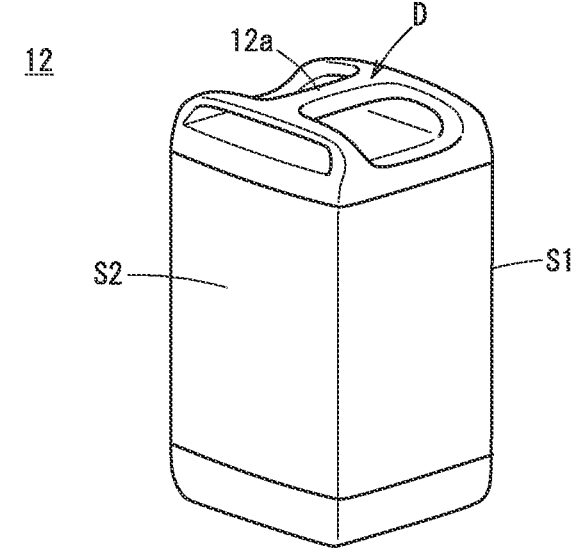

FIGS. 31A and 31B are perspective views of the mobile battery 12. In the mobile battery 12 shown in FIG. 31A and the mobile battery 12 shown in FIG. 31B, the shapes of the handles 12a are different. In an upper plan view of the mobile battery 12, the shape of the handle 12a of the mobile battery 12 shown in FIG. 31A is T-shaped, whereas the shape of the handle 12a of the mobile battery 12 shown in FIG. 31B is H-shaped. The second battery guide 90i abuts against a portion of the mobile battery 12 indicated by the reference character C in FIG. 31A, or alternatively, against a portion of the mobile battery 12 indicated by the reference character D in FIG. 31B, whereby the forward tilting displacement of the mobile battery 12 that is placed on the battery tray 16 is restricted. Consequently, even if there are mobile batteries 12 in which the shapes of the handles 12a differ as in the mobile batteries 12 shown in FIGS. 31A and 31B, it is possible to prevent the mobile batteries 12 from being withdrawn from the battery tray 16.

DESCRIPTION OF REFERENCE NUMERALS

10 . . . battery exchanging machine (holding device)
12 . . . mobile battery (electrical equipment)
12b . . . connector (first terminal)
16 . . . battery tray (holding unit)
20 . . . front tray locking mechanism (regulating unit)
22 . . . shutter (cover member)
24 . . . connector (second terminal)
46 . . . first link arm (connecting portion)
48 . . . second link arm (connecting portion)
60 . . . first battery guide (withdrawal regulating unit)
74 . . . rear tray locking mechanism (regulating unit)
90 . . . stationary battery power supply device (holding device)
90g . . . door member
90i . . . second battery guide (other regulating unit)

What is claimed is:

1. A holding device comprising:
a storage battery holder configured to hold an electrical power storage device being inserted into the holding device, wherein the storage battery holder is capable of rotating about a rotary axis that is a center of rotation, thereby positioning the storage battery holder in either a first position or a second position; and
a regulator configured to restrict rotation of the storage battery holder when the storage battery holder is positioned in the second position;
a holding surface of the storage battery holder, wherein the holding surface is configured to:
when the storage battery holder is positioned in the first position, hold the electrical power storage device in a more horizontal state relative to a bottom surface of the holding unit in order to allow removal from the holding device, and
when the storage battery holder is positioned in the second position hold the electrical power storage device in a less horizontal state relative to a bottom surface of the holding unit and thereby incapable of removal from the holding device due to the regulator restricting rotation of the storage battery holder.

2. The holding device according to claim 1, wherein, in a direction of rotation of the storage battery holder, in a case in which a direction in which the storage battery holder is displaced from the first position to the second position is defined as a rotation away from a rear part of the holding device toward a front part of the holding device, and wherein, at least a portion of the regulator is arranged at a position more toward the front part of the holding device than the storage battery holder.

3. The holding device according to claim 1, wherein the regulator comprises an engaging element comprising an end side that is arranged in at least one of a housing or a frame portion of the holding device, and another end side that engages with the storage battery holder.

4. The holding device according to claim 3, wherein when the storage battery holder is positioned in the second position, the engaging element engages with the storage battery holder in a state in which the electrical power storage device is not held by the storage battery holder, and
wherein regulator is capable of moving with respect to the storage battery holder in a manner so that engagement with the storage battery holder is released in a state in which the electrical power storage device is held by the storage battery holder.

5. The holding device according to claim 4, wherein the regulator comprises an operating element provided on the storage battery holder so operating element rotates with the storage battery holder; and wherein in a state in which the electrical power storage device is held by the storage battery holder, the end side of the operating element abuts against the electrical power storage device, and the other end side abuts against the engaging element.

6. The holding device according to claim 4, wherein, in a case in which the electrical power storage device is in a state of being positioned in an incorrect direction by the storage battery holder, at least one of the regulator, the storage battery holder, or the electrical power storage device, is formed or disposed in a manner so that engagement between the engaging element and the storage battery holder is not released.

7. The holding device according to claim 1, wherein, when the storage battery holder is positioned in the second position, the rotary axis is arranged toward a frontward side of the holding device.

8. The holding device according to claim 1, wherein the storage battery holder comprises a rotation regulator configured to restrict rotation of the storage battery holder in a case in which the storage battery holder is positioned in the first position.

9. The holding device according to claim 1, further comprising a withdrawal regulator configured to restrict withdrawal of the electrical power storage device from the storage battery holder in a case in which the storage battery holder is positioned in the first position.

10. The holding device according to claim 9, wherein the withdrawal regulator is further configured to restrict withdrawal of the electrical power storage device from the storage battery holder when the storage battery holder is positioned in a direction perpendicular to the holding surface.

11. The holding device according to claim 10, wherein, the withdrawal regulator comprises a curved surface portion formed in a shape that follows along a trajectory of rotation in a case in which the electrical power storage device is rotated together with the storage battery holder in a state in which the electrical power storage device is held by the storage battery holder.

12. The holding device according to claim 9, wherein the withdrawal regulator is further configured to restrict withdrawal of the electrical power storage device when the storage battery holder is positioned in a direction in which the rotary axis extends.

13. The holding device according to claim 1, further comprising a door member, wherein when the storage battery holder is positioned in the second position, the door member is configured to cover, a frontward side of the electrical power storage device being held by the storage battery holder.

14. The holding device according to claim 13, wherein an opposite side from the frontward side is defined as a rearward side, wherein the door member comprises another withdrawal regulator extending from the door member to the rearward side, and wherein the other withdrawal regulator is further configured to, when the storage battery holder is positioned in the first position, restrict withdrawal of the electrical power storage device.

15. The holding device according to claim 14, wherein:
the door member comprises a reinforcing portion on a surface on the rearward side of the door member; and
the other withdrawal regulator is disposed at a position overlapping with the reinforcing portion.

16. The holding device according to claim 3, wherein electrical power storage device comprises a first terminal, and wherein the holding device further comprises a second terminal that is:
arranged at the at least one of the housing or the frame portion of the holding device, and
configured to be connected to a first terminal of the electrical power storage device.

17. The holding device according to claim 16, further comprising:
an insertion section provided in the storage battery holder, through which the second terminal is inserted; and
a cover member configured to:
be capable of moving relative to the storage battery holder, and
cover at least a portion of the insertion section.

18. The holding device according to claim 17, further comprising a connecting portion configured to connect the cover member to the at least one of the housing or the frame portion.

19. The holding device according to claim 1, wherein the storage battery holder comprises a first storage battery holder of storage battery holders of the holding device, wherein the holding device further comprises a second storage battery holder of the storage battery holders, and wherein the first storage battery holder and the second storage battery holder are arranged at positions:
having different heights from each other relative to the holding surface, and
offset from each other in a direction perpendicular to the holding surface.

20. The holding device according to claim 1, wherein the electrical power storage device comprises an electrical power storage device capable of being repeatedly charged and discharged.

21. The holding device according to claim 20, wherein the holding device comprises a charging and discharging device that carries out at least one of charging or discharging of the electrical power storage device.

* * * * *